Dec. 14, 1954   C. A. PARKER ET AL   2,696,945
COMBINED TYPEWRITER AND ACCOUNTING MACHINE
Filed June 14, 1949   21 Sheets-Sheet 1

INVENTORS.
Clifton K. Rainey
Charles A. Parker
By
Eugene E. Stevens
ATTORNEY.

Dec. 14, 1954  C. A. PARKER ET AL  2,696,945
COMBINED TYPEWRITER AND ACCOUNTING MACHINE
Filed June 14, 1949  21 Sheets-Sheet 2

INVENTORS.
Clifton K. Rainey
Charles A. Parker
By Eugene E. Stevens
ATTORNEY.

Dec. 14, 1954 C. A. PARKER ET AL 2,696,945
COMBINED TYPEWRITER AND ACCOUNTING MACHINE
Filed June 14, 1949 21 Sheets-Sheet 3

INVENTORS.
Clifton K. Rainey
and Charles A. Parker
BY
Eugene E. Stevens
ATTORNEY.

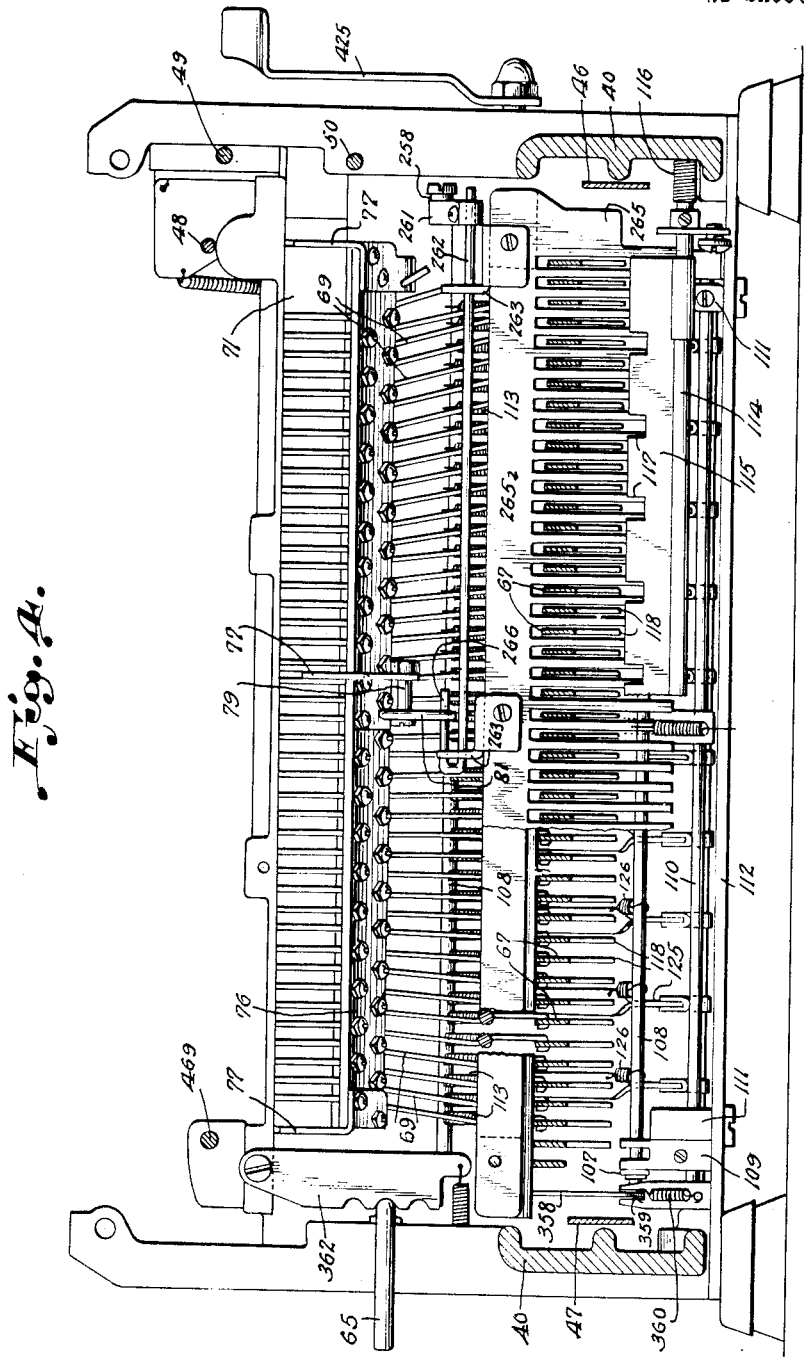

Dec. 14, 1954  C. A. PARKER ET AL  2,696,945
COMBINED TYPEWRITER AND ACCOUNTING MACHINE
Filed June 14, 1949  21 Sheets-Sheet 5

INVENTORS.
Clifton K. Rainey
Charles A. Parker
BY Eugene E. Stevens
ATTORNEY.

INVENTORS.
Clifton K. Rainey
Charles A. Parker
By
Eugene E. Stevens
ATTORNEY.

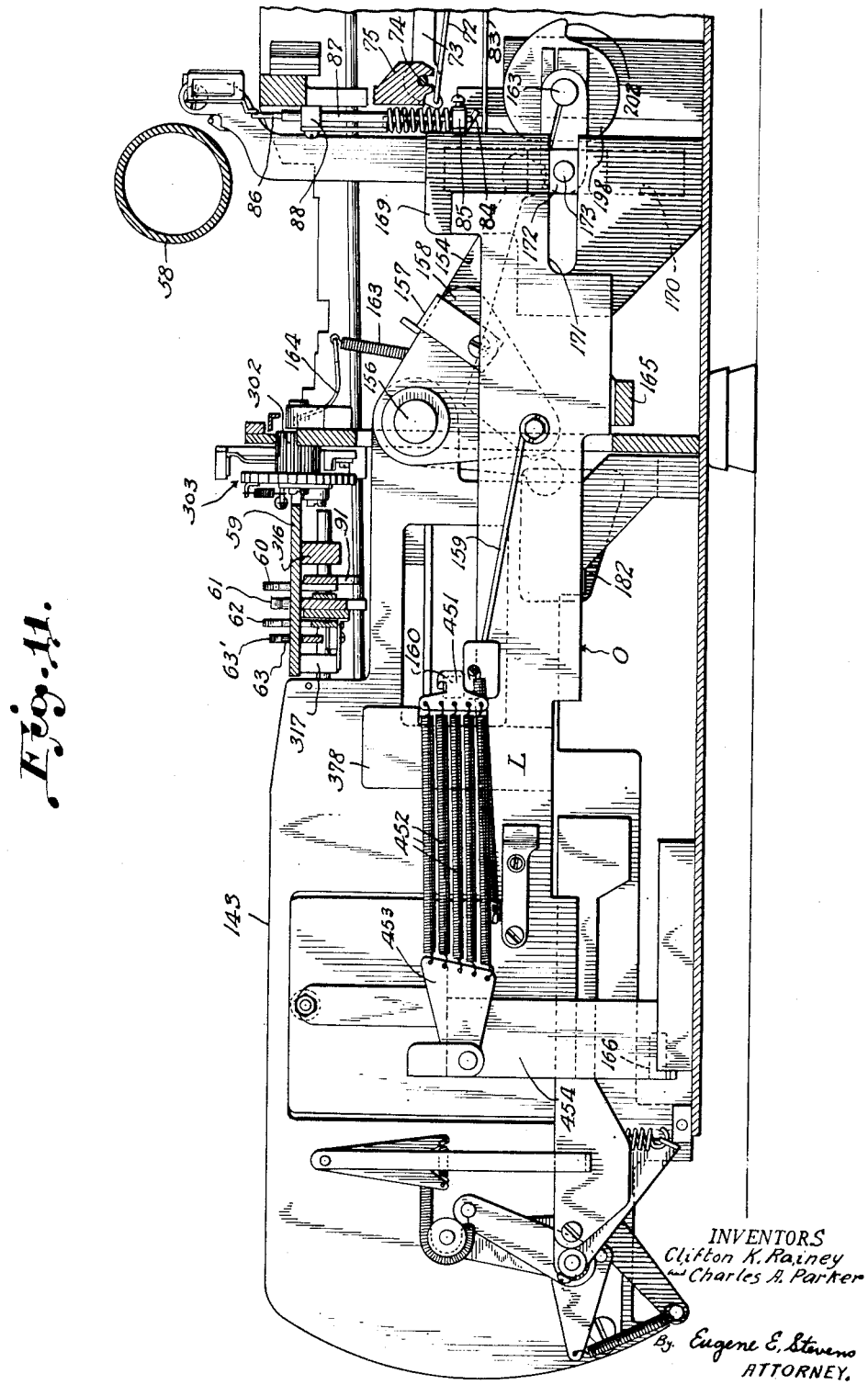

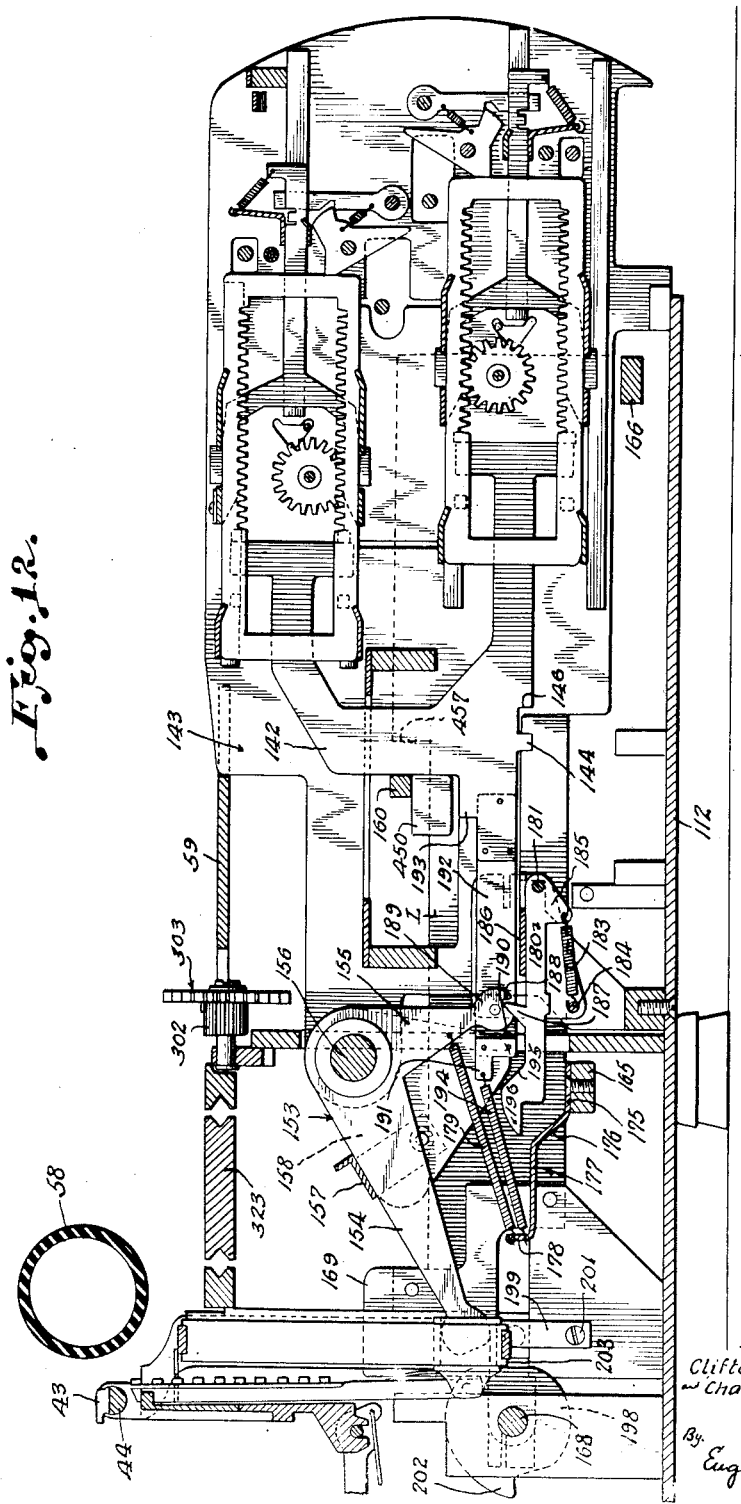

Dec. 14, 1954
C. A. PARKER ET AL
2,696,945
COMBINED TYPEWRITER AND ACCOUNTING MACHINE
Filed June 14, 1949
21 Sheets-Sheet 12
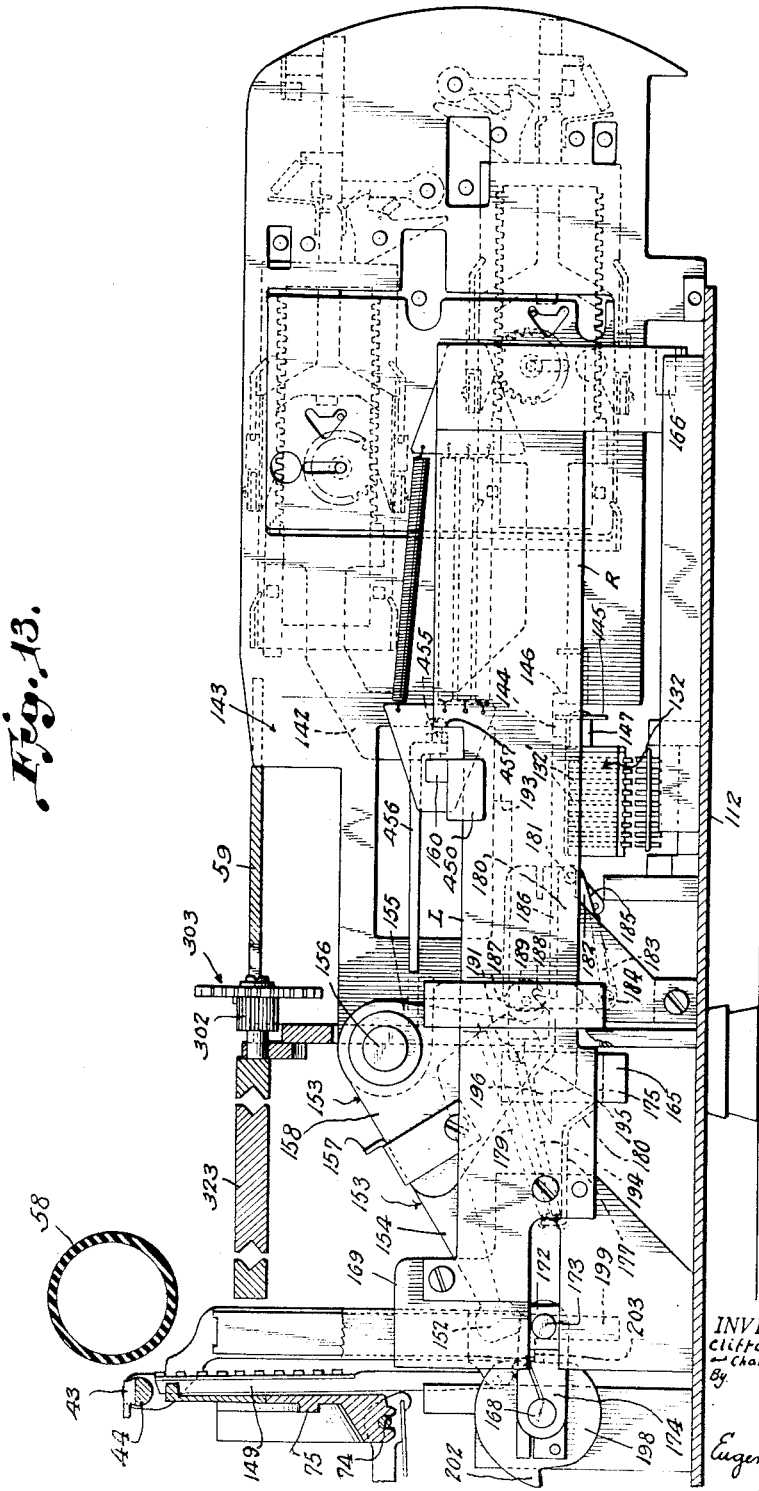
INVENTORS.
Clifton K. Rainey
Charles A. Parker
By
Eugene E. Stevens
ATTORNEY Dec. 14, 1954   C. A. PARKER ET AL   2,696,945
COMBINED TYPEWRITER AND ACCOUNTING MACHINE
Filed June 14, 1949                        21 Sheets-Sheet 13
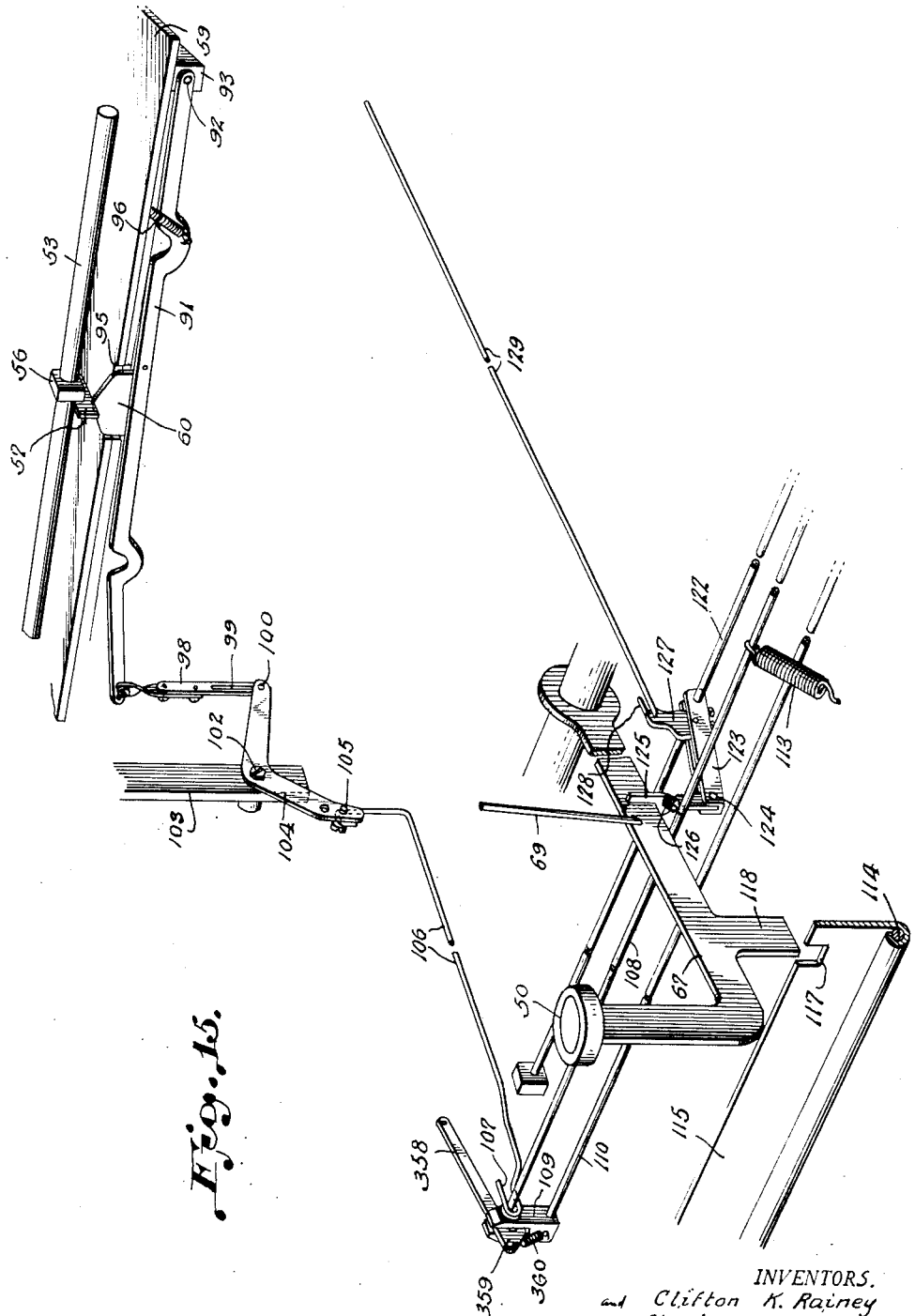
INVENTORS.
Clifton K. Rainey
BY Charles A. Parker
Eugene E. Stevens
ATTORNEY.

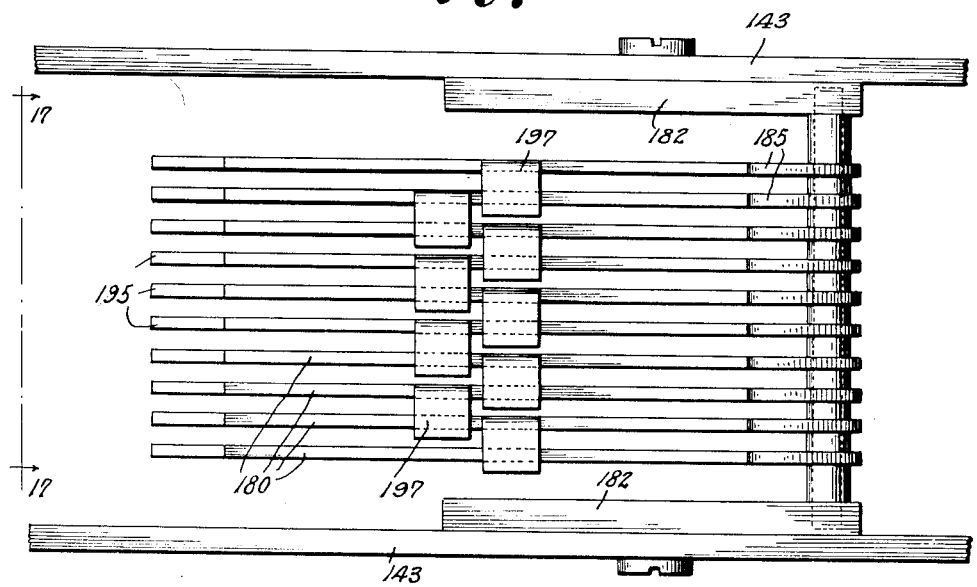
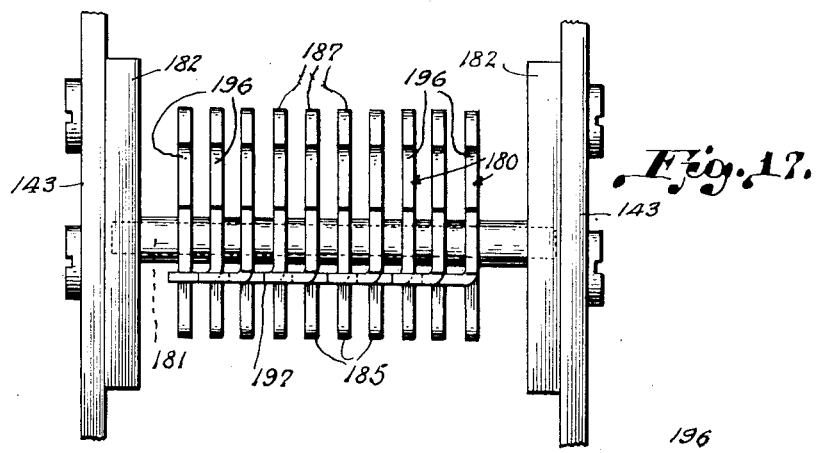
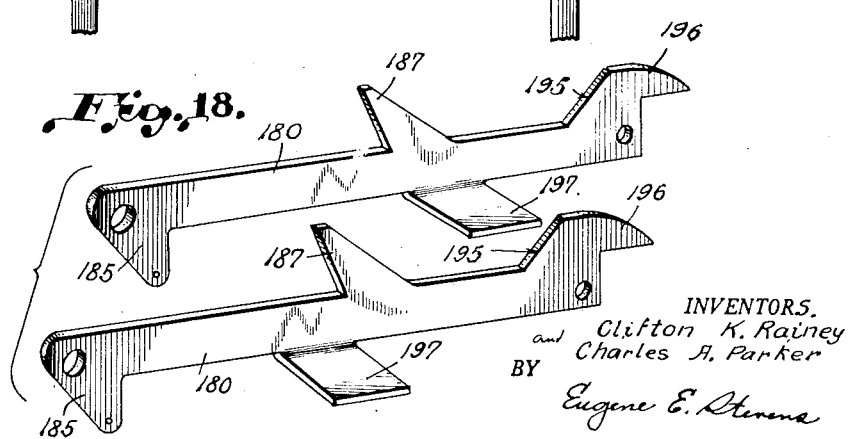

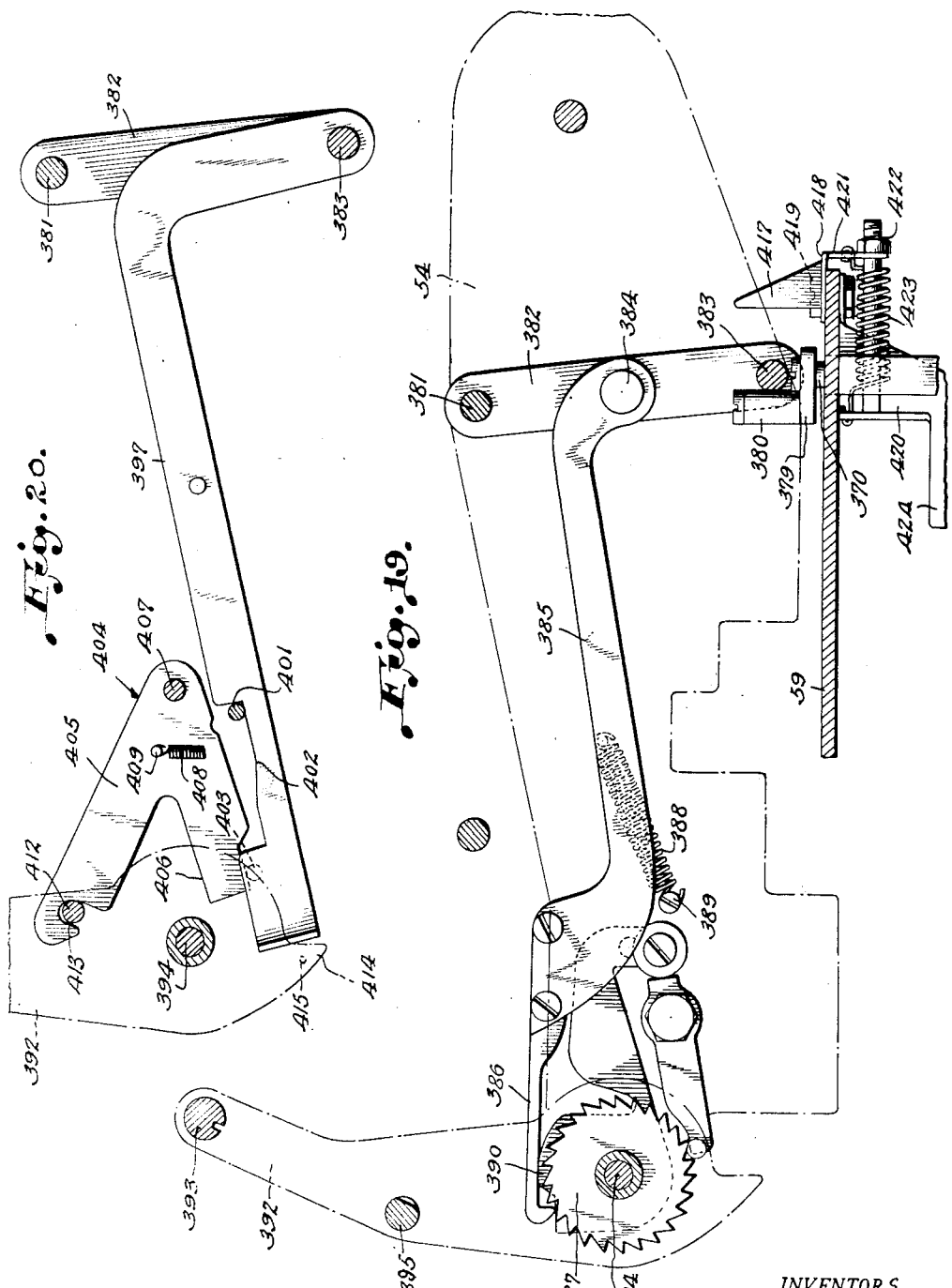

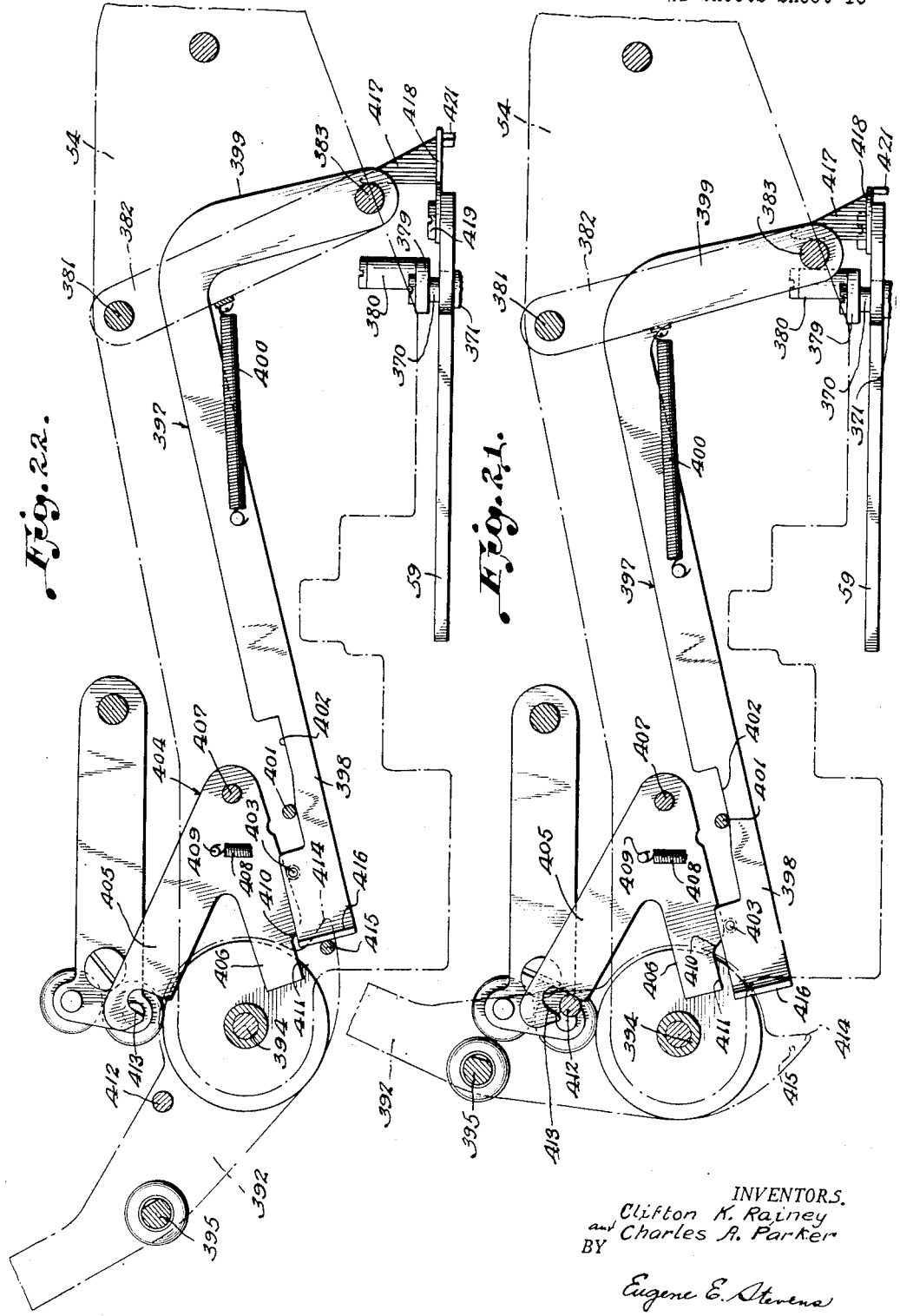

Dec. 14, 1954  C. A. PARKER ET AL  2,696,945
COMBINED TYPEWRITER AND ACCOUNTING MACHINE
Filed June 14, 1949  21 Sheets-Sheet 17
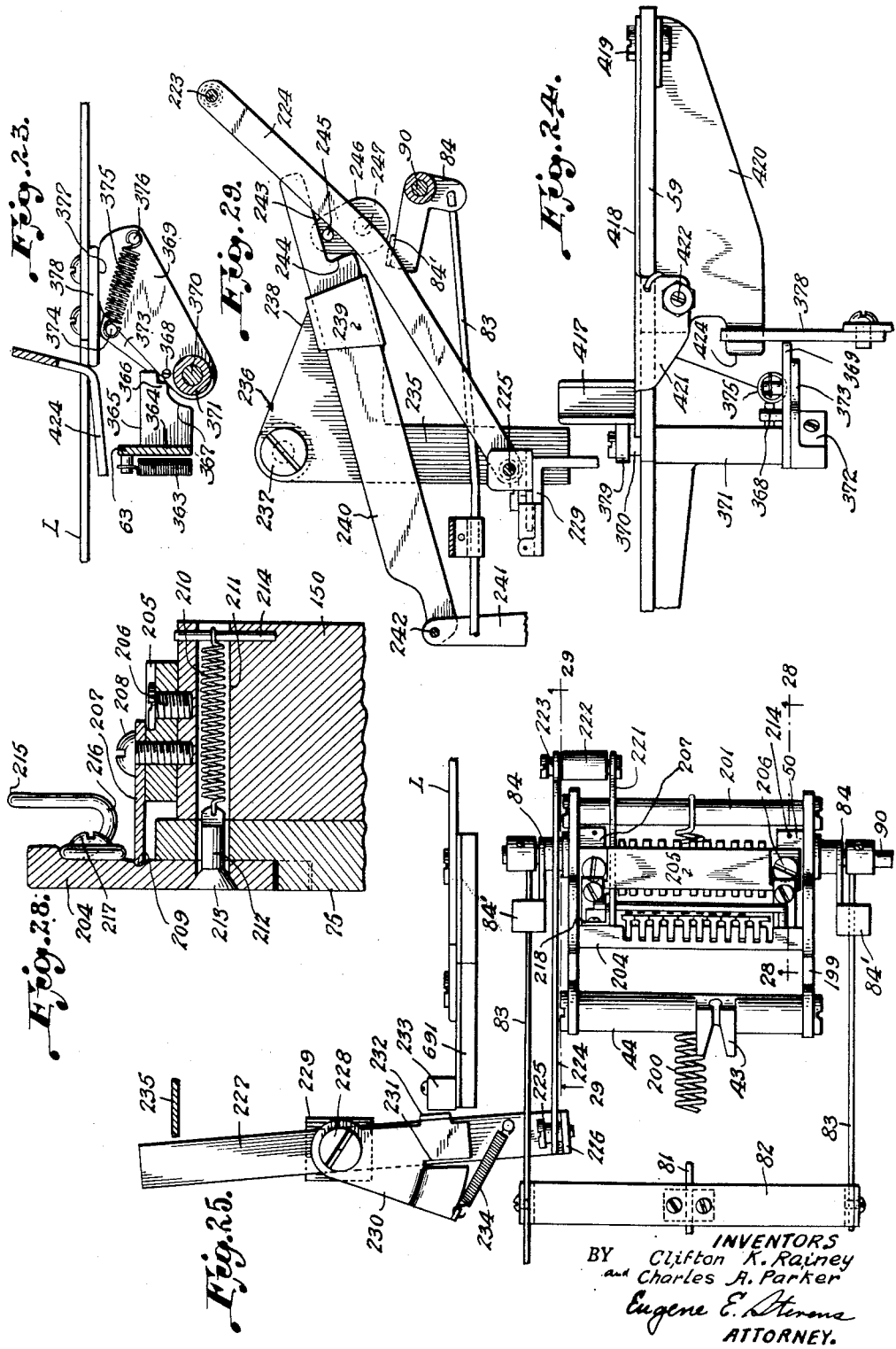
INVENTORS
BY Clifton K. Rainey
and Charles A. Parker
Eugene E. Stevens
ATTORNEY.

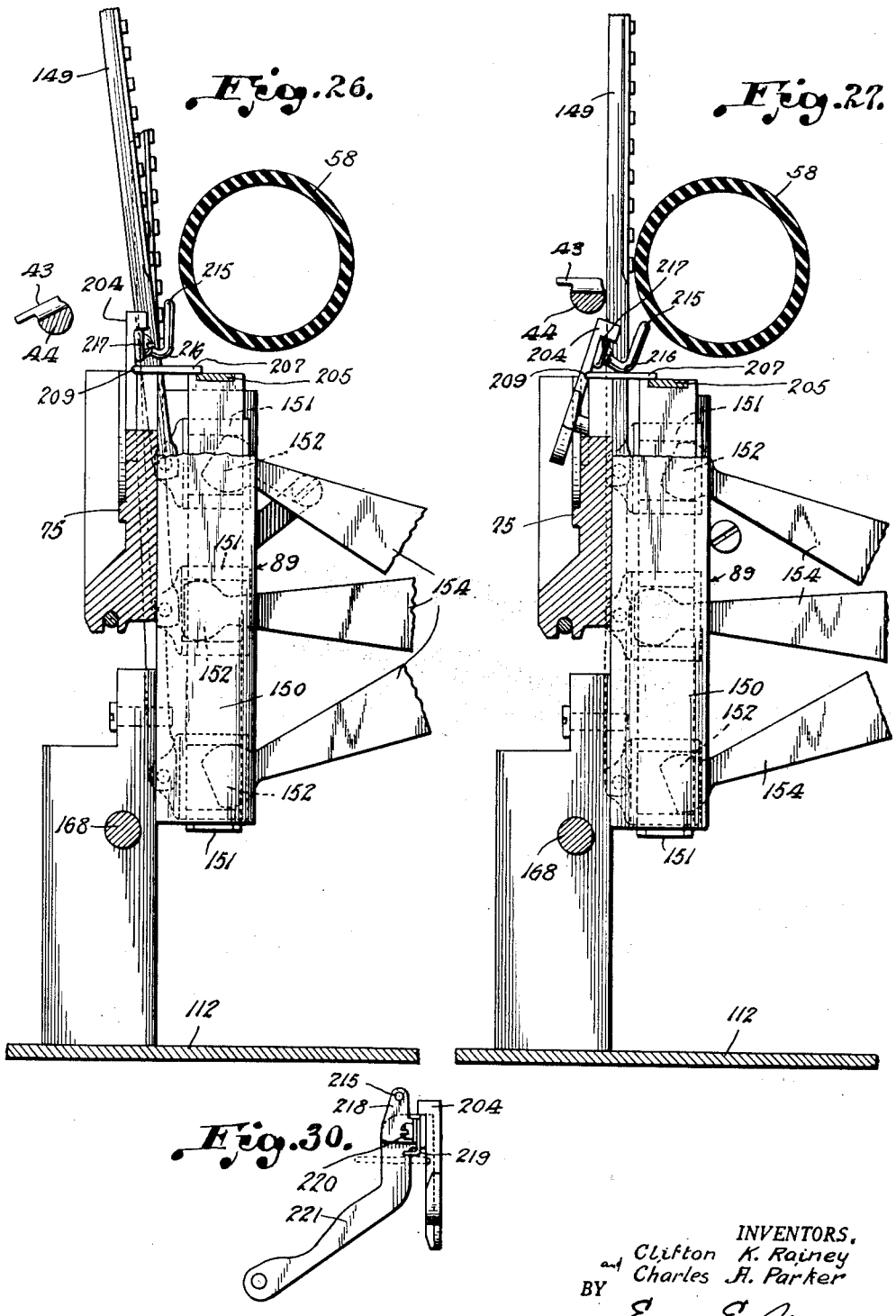

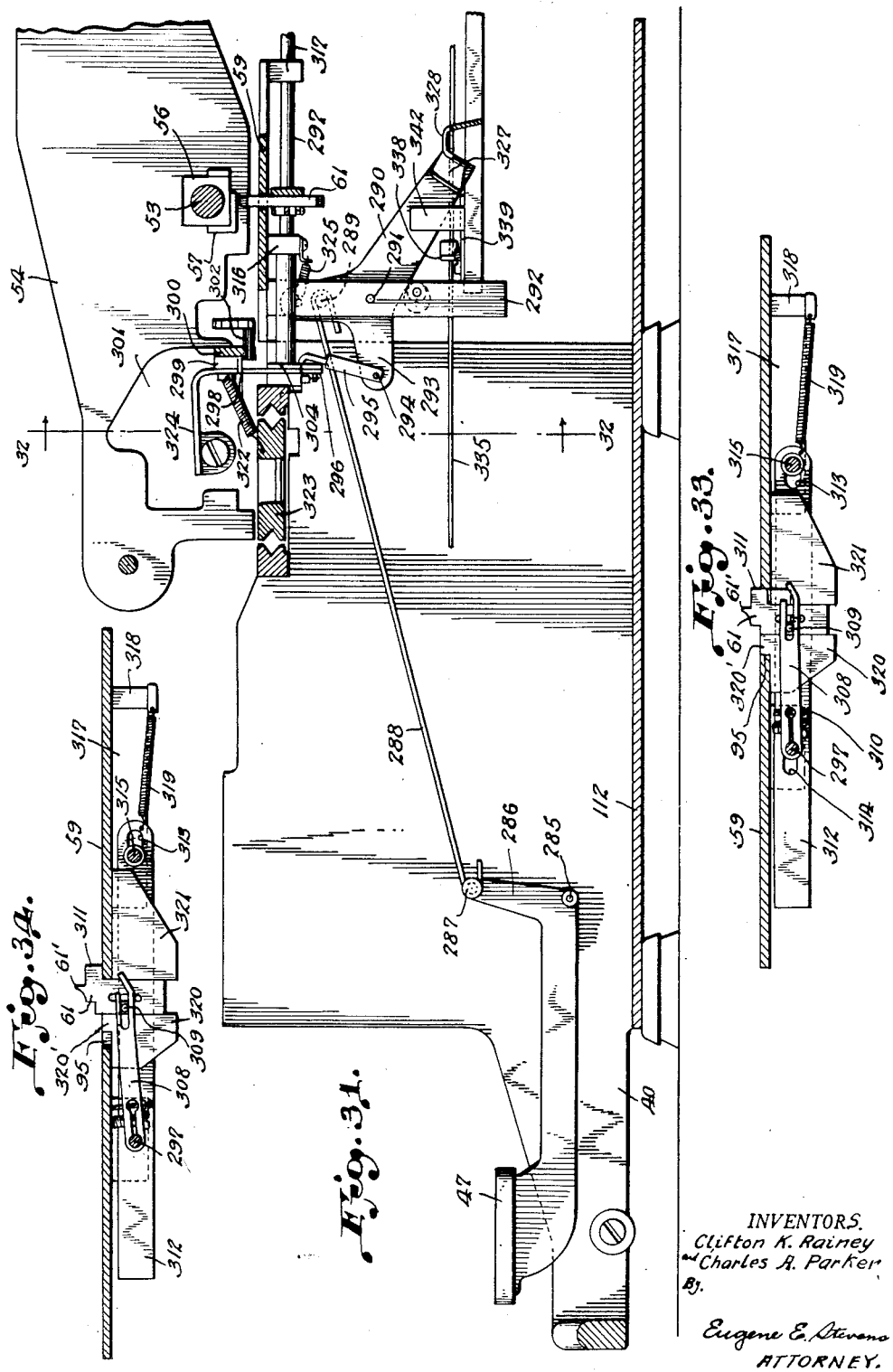

Dec. 14, 1954   C. A. PARKER ET AL   2,696,945
COMBINED TYPEWRITER AND ACCOUNTING MACHINE
Filed June 14, 1949   21 Sheets-Sheet 20
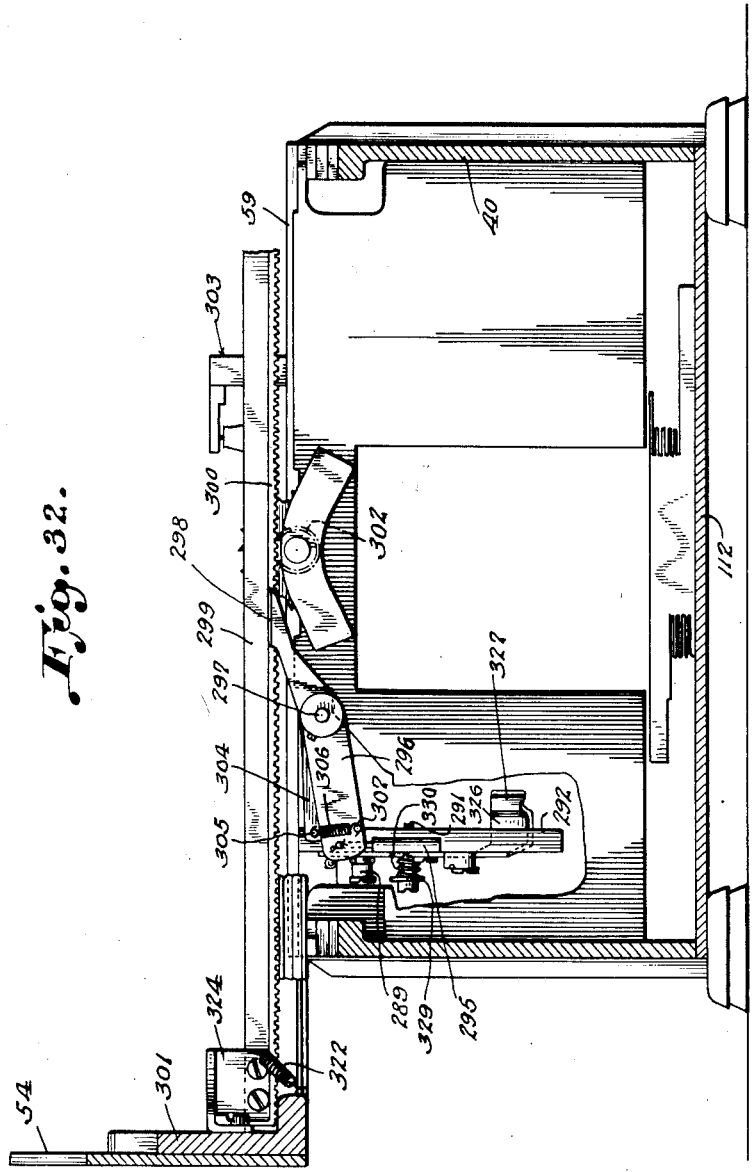
INVENTORS.
Clifton K. Rainey
and Charles A. Parker
BY
Eugene E. Stevens
ATTORNEY.

Dec. 14, 1954   C. A. PARKER ET AL   2,696,945
COMBINED TYPEWRITER AND ACCOUNTING MACHINE
Filed June 14, 1949   21 Sheets-Sheet 21

*Fig. 35.*

INVENTORS.
Clifton K. Rainey
and Charles A. Parker
BY
Eugene E. Stevens
ATTORNEY.

2,696,945

COMBINED TYPEWRITER AND ACCOUNTING MACHINE

Charles A. Parker and Clifton K. Rainey, Knoxville, Tenn., assignors, by mesne assignments, to Burroughs Corporation, a corporation of Michigan Application June 14, 1949, Serial No. 99,081

14 Claims. (Cl. 235—60.12)

This invention relates to accounting machines. It provides a single machine operative under selective control to function as either a typing machine, a posting machine, or a calculating machine, in which all typing and all calculator indexing operations are governed from a common, single keyboard. Incidental to the performance of its various functions, the machine embodies the usual manual and automatic controls of known typewriting, posting, and calculating machines; and additionally includes novel manual as well as automatic controls for conditioning the machine, at the will of an operator, either to carry out or to exclude, during the performance of one of its functions, the performance of all or part of its other functions.

Reference is made to the copending applications of Clifton King Rainey: Serial No. 629,184, filed November 16, 1945, now Patent No. 2,492,887; Serial No. 629,185, filed November 16, 1945, now Patent No. 2,496,357; and to U. S. Patent #2,183,920, of December 19, 1939, to the same inventor. An object of this invention is to provide improvements in and related to the inventions disclosed in said applications and patent.

Another object of the invention is to provide an accounting machine which incorporates a typing machine and a calculating machine having a single keyboard in common and a type printing point common to both.

A further object is to provide an accounting machine including in one assembly a typing machine and a calculating machine with means for converting a portion of the typing machine to serve as indexing means for the calculating machine.

A further object is to provide an accounting machine having calculating mechanism including actuators paired with corresponding adding type carriers, in which the actuator and type carrier in each pair have independent and relative movement in the operation of the machine.

Another object is to provide an accounting machine having calculating mechanism including actuators and a cycling operating member therefor, wherein the actuators operate under spring tension derived from the operating member in the course of its cycle movement.

Still another object is to provide an accounting machine having adding type carriers movable into and out of printing position relative to a platen, and a cycling operating member, wherein the type carriers are moved under spring tension derived from the operating member in the course of its cycle movement.

A further object is to provide an accounting machine having a visible front strike typing machine and adding type printing means operative from the same keys on a single keyboard common to both to print at a printing point common to both.

A still further object is to provide in an accounting machine having adding type carriers movable into and out of printing position and a single hammer common to a plurality of the carriers, means for holding out of printing position all adding type carriers to the left of those comprising an item to be printed.

Other objects will be apparent to those skilled in the art.

In the accompanying drawings:

Fig. 4 is a vertical section substantially on the line 4—4 of Fig. 1;

Fig. 11 is a vertical section substantially on the line 11—11 of Fig. 6;

Fig. 12 is a vertical section substantially on the line 12—12 of Fig. 6;

Fig. 13 is a vertical section substantially on the line 13—13 of Fig. 6;

Fig. 15 is a perspective view of the key disabling and converting means;

Fig. 16 is a bottom plan view of levers 180 and associated parts;

Fig. 17 is an end view on the line 17—17 of Fig. 16;

Fig. 18 is a perspective view of latch fingers employed in connection with the adding type bar operation;

Fig. 19 is an elevation of detail shown in Fig. 14;

Figs. 20, 21 and 22 are, respectively, detail views of the front feed bail lock mechanism;

Fig. 23 is a section on line 23—23 of Fig. 14;

Fig. 24 is a fragmentary rear elevation of the structure illustrated in Fig. 23;

Fig. 25 is a top plan view of the adding type bar mechanism;

Figs. 26 and 27 are vertical sections through the adding type bar lift mechanism;

Fig. 28 is a vertical section on line 28—28 of Fig. 25;

Fig. 29 is a vertical section on line 29—29 of Fig. 25;

Fig. 30 is a detail view of lever 221 and comb 204;

Fig. 31 is a vertical section on line 31—31 of Fig. 1;

Fig. 32 is a vertical section substantially on the line 32—32 of Fig. 31;

Fig. 33 is a detail view of the tabulator pawl in its unlatched normal position;

Fig. 34 is a similar detail of the tabulator pawl in latched position; and

Fig. 35 is a section on the line 35—35 of Fig. 14, with the carriage moved inwardly from its full left position.

Figure 1:
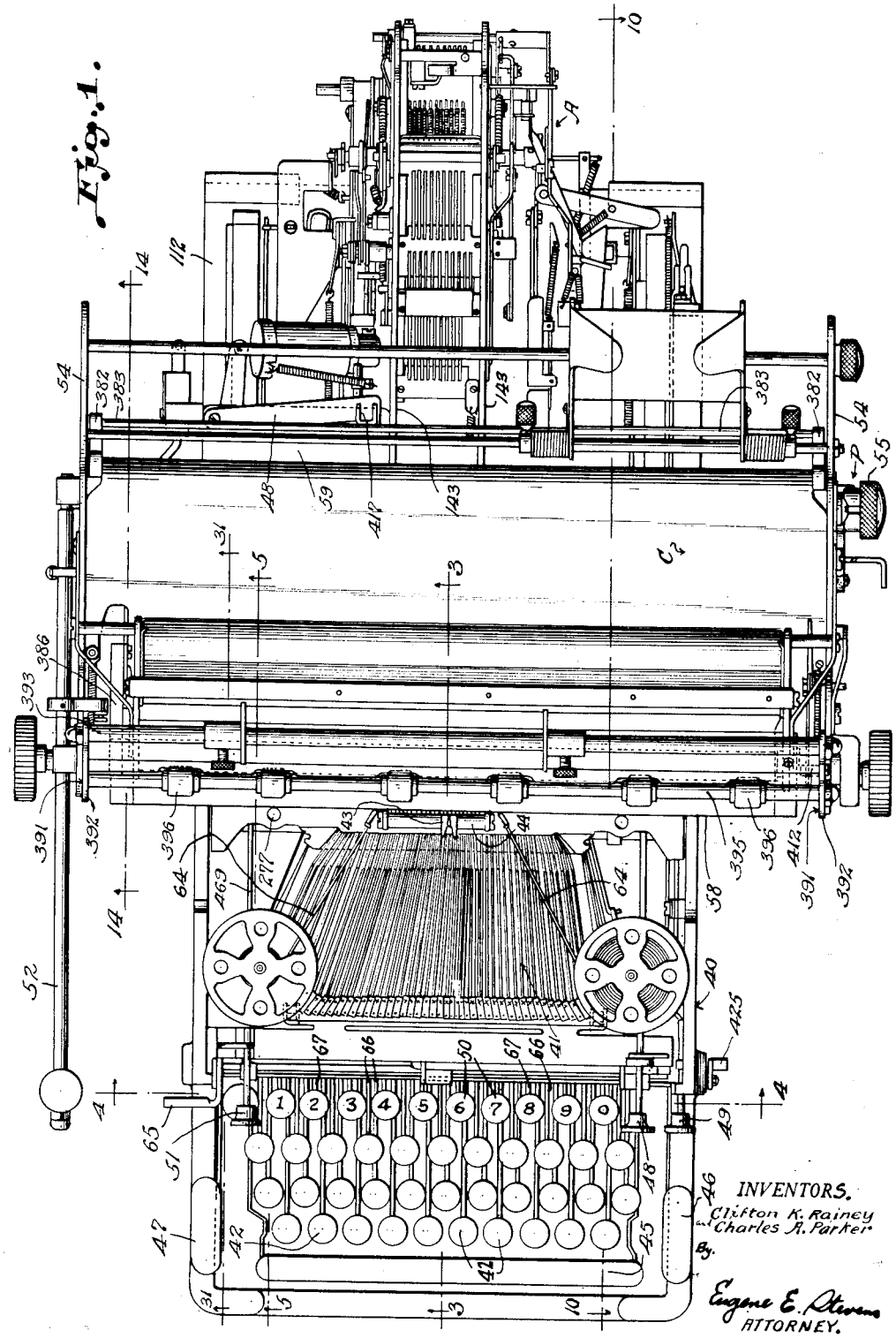
Fig. 1 is a top plan view of the machine.
Figure 2:
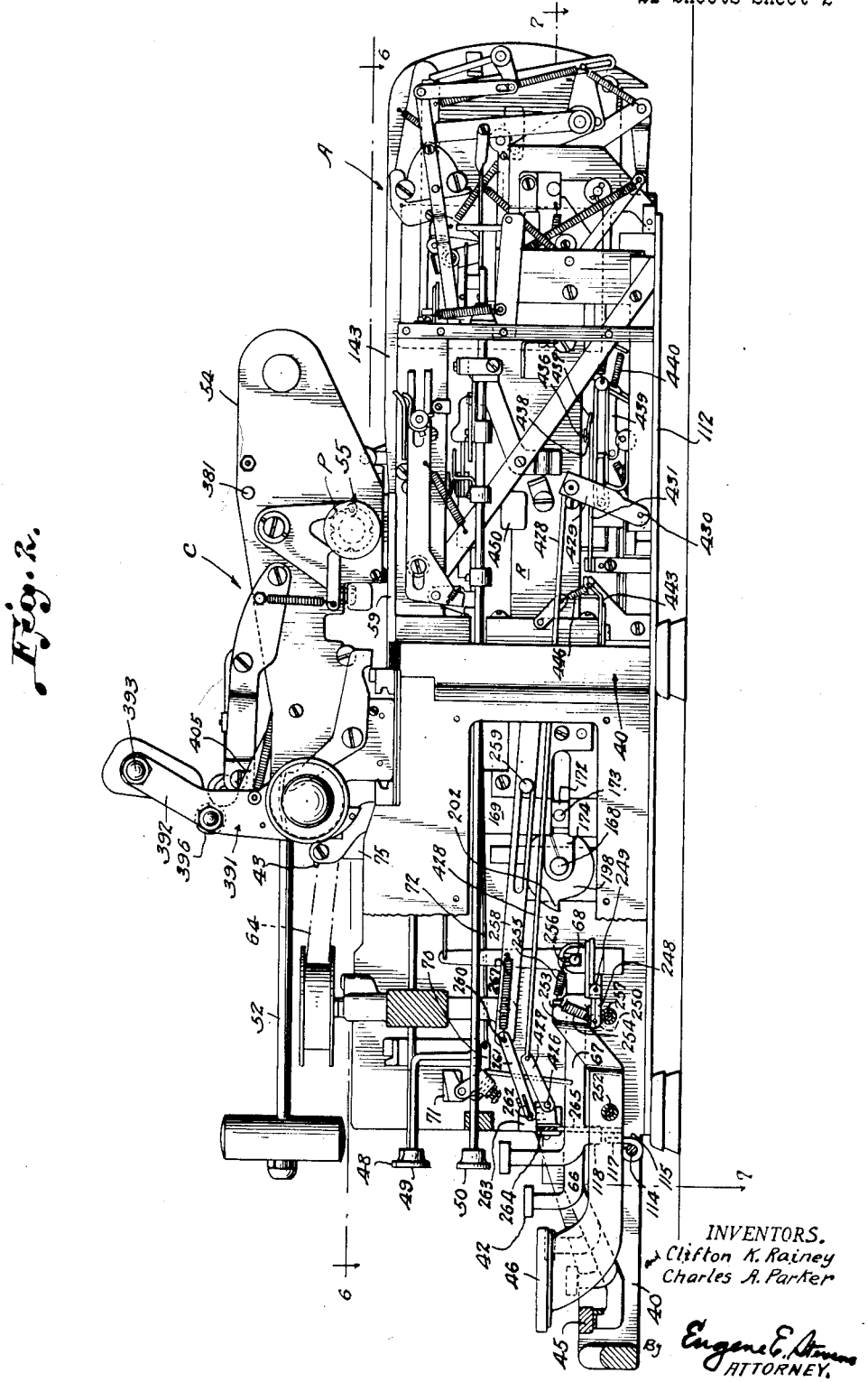
Fig. 2 is a side elevation with the front part of the main frame removed for illustration of detail.

As indicated generally in Figs. 1 and 2, the apparatus essentially comprises a main frame 40 of the general form and structure of a typewriter frame, being provided with a keyboard and having a carriage assembly C mounted on the frame for reciprocation in the usual manner of typewriter and posting machine carriage operation.

The machine is equipped with a bank of front strike type bars 41 operated from keys 42 for front strike visible printing at a point determined by a type guide 43 which forms part of a hammer member 44 that operates in a manner later described to effect a common striking movement against a properly positioned series of adding type bars when they are disposed for printing. The keyboard has the usual spacer 45 and, at the right hand side of the frame, a motor bar 46. On the left hand side of the frame is disposed a tabulator bar 47. The front plate of the frame mounts keys for controlling the functions of calculating mechanism generally indicated at A. These keys at the right hand side of the frame comprise an adding key 48, a total key 49, a subtotal key 50 and, at the left hand side of the frame, a subtract key 51. The type guide 43 establishes the printing point and establishes also the decimal point for item printing in the calculating machine operation. The carriage is provided at its left hand end with a forwardly directed return handle 52 which is substantially of conventional design and which may be rotated to effect line spacing in the usual manner of such devices.

In the apparatus of this invention there are the usual carriage controls common to typing and posting machines, and in addition there are controls, in association with tabulator mechanism and various other instrumentalities, which under the operation of the carriage change the sequence of control function. This change in sequence has relation to the various phases of bookkeeping; such as, accounts receivable, payroll, etc. Each phase makes use of a different set of forms, and the columnar arrangement of various forms requires different tab settings and different sequential operation of the mechanism at different tabulator points. The carriage is provided with change means manually shiftable to condition the machine for desired sequential operation in accordance with that particular bookkeeping phase in which the machine is currently employed. This phase change mechanism is indicated generally at P and is the same mechanism disclosed in the application of Clifton King Rainey, Serial No. 629,184, filed November 16, 1945, now Patent No. 2,492,887. In general, it comprises a shaft 53 mounted for rotation in the carriage end plates 54 under the influence of an operating head or knob 55. The shaft has secured thereto for rotation therewith a substantially rectangular mounting member 56 on which are selectively positioned at desired intervals along its length a series of control lugs 57. The change control shaft 53 parallels the roll platen 58 and is spaced rearwardly therefrom to overlie a control plate 59 that is mounted on and horizontally across the upper rear of the main frame. This plate serves as a support for a plurality of functional control detents, here shown as four in number, respectively designated as 60, 61, 62 and 63, which will be described later in detail. These detents operate under the actuation of the lugs 57 of the phase-changing unit to condition the machine for the desired sequential operation of the various elements of the mechanism in accordance with the particular bookkeeping phase in which the machine is engaged.

The machine is provided with mechanism for lifting the ribbon 64 to printing position when an item is to be printed from either the letter type bar assembly or the adding type bar assembly. The machine also employs mechanism to effect movement of the ribbon in accordance with ordinary letter type bar operation, and in accordance with the machine operation when being used as an adding machine.

A highly important aspect of the present invention is its selective operation under the influence of a function control lever 65 mounted at the left hand side of the frame in advance of the front face plate for manipulation by an operator. This function control lever 65 is adapted for movement to any of three control positions, as best shown in Fig. 4. In its uppermost position it conditions the machine for operation as an adding machine. In its second, or intermediate, position the machine is conditioned to function as a posting machine. In its lowermost position the machine is conditioned for straight typing operation.

Another important feature of the invention resides in the mechanism by which the numeral keys of the keyboard are converted to indexing means for the calculating unit. In the course of such conversion the letter keys are locked against operation. The numeral keys function as indexing means in both the upper and intermediate positions of the function control lever 65. In the intermediate position of the function control lever, when the machine is conditioned to carry out its posting functions, the indexing means is substantially governed by the carriage controls. In the upper position of the function control lever, when the machine is conditioned to function as a calculating mechanism, the indexing means is partially under carriage control. Incidental to the operation of the apparatus in its calculating machine function, means is provided to prevent printing of ciphers to the left of items printed from the adding type bars.

Other salient features of the apparatus include holding means associated with the tabulator mechanism, which permits actuation of the tabulator bar with the quick touch used in conjunction with the keyboard keys. This mechanism makes it unnecessary for an operator to hold down the tabulator bar until the desired tabulating action has taken place. A simple finger strike on the tabulator bar is all that is required. The carriage assembly incorporates a novel front feed arrangement including a paper positioning bail, and associated mechanism that is operative with a three-fold function: (1) to lock the front feed against opening during an operating cycle of the machine, (2) to operate the line spacing mechanism, provided the appropriate control is in position, and (3) to close the front feed at the start of an operating cycle.

An essential part of the machine is embodied in a driven reciprocable element which operates through a defined cycle between limit positions in one of which it is at rest, under the influence of motor means to accomplish many functions and to effect the positioning and actuation of the various members and instrumentalities by which the different operations of the associated mechanisms are carried out. This member, herein referred to as an operating frame generally designated at O, provides for the actuation of the various instrumentalities after the machine has been conditioned for their proper sequential operation. It is an important aspect of this invention that, for the greater part, the operation of the various levers, detents, and actuators is under the influence of springs, whereby the various elements are biased or urged into operating movement that is normally restrained by the withholding action of other elements movable under the influence of the operating frame to permit operation of the various levers, detents, and actuators under the influence of their springs. This relieves the motor of a very considerable load, and not only assures fast, smooth operation of the machine but also eliminates to a major extent any possibility of breakage in the event of jamming. Should something occur to jam any parts of the mechanism, the affected parts will not be moved under a force greater than that exerted by their associated springs.

The main frame, type bars, type bar segment, the key levers with their type bar connecting wires, the universal bar, the carriage spring drive and ribbon wind, including the automatic reverse, are all substantially of known construction. Briefly described, these comprise the usual banks of letter key levers 66 and an upper bank of numeral key levers 67. As shown best in Figs. 2, 3 and 5, the key levers are pivoted at their inner ends on a cross shaft 68 mounted in the main frame structure. Each key is operated by manual depression to pull down by means of a connecting rod 69 an associated link plate 70 that is pivoted at one end to a frame cross member 71 in the usual manner of such assemblies. The link plate is connected by a draw bar 72 with the heel of its associated type bar 73 which, adjacent its inner end portion, is pivoted on a supporting shaft 74 mounted at the type segment 75. As a key is depressed, its type bar is swung up to platen striking position. The universal bar 76 is located below the assembly of link plates 70 and is pivotally suspended from the support 71 by mounting lugs 77 which are pivoted on the shaft 78 which carries the link plates. Depression of any of the link plates 70 rocks the universal bar on its pivot and this in turn operates the ribbon lift mechanism by which the ribbon 64 is lifted to its proper typing position. This lift movement is accomplished by the engagement of a lateral stud 79 fixedly mounted on an intermediate member 77 of the universal bar assembly with a terminal hook 80 on the upper end of a stiff wire connector 81 which, at its other end, is secured to a cross piece 82 that connects at its ends with forwardly extending actuator wires 83 on the ribbon lift. The rear end of each wire 83 is in pivotal connection with one arm of a bell crank lever 84 which has its other arm in cooperative engagement with a collar 85 mounted on the lower end of the ribbon lift rod 86 adjacent thereto. The lift rod is vertically slidable in a tubular holder 87 that is mounted in supporting means 88 carried by the type bar segment. The bell crank lever 84 is pivoted at each side of the adding type bar mounting frame 89 on a stud 90 which extends laterally from the frame so that, upon forward movement of the wires 83, the bell crank levers are rocked on their pivots to elevate the collars 85 and their associated parts into type strike position.

Key converting means

Figure 3:
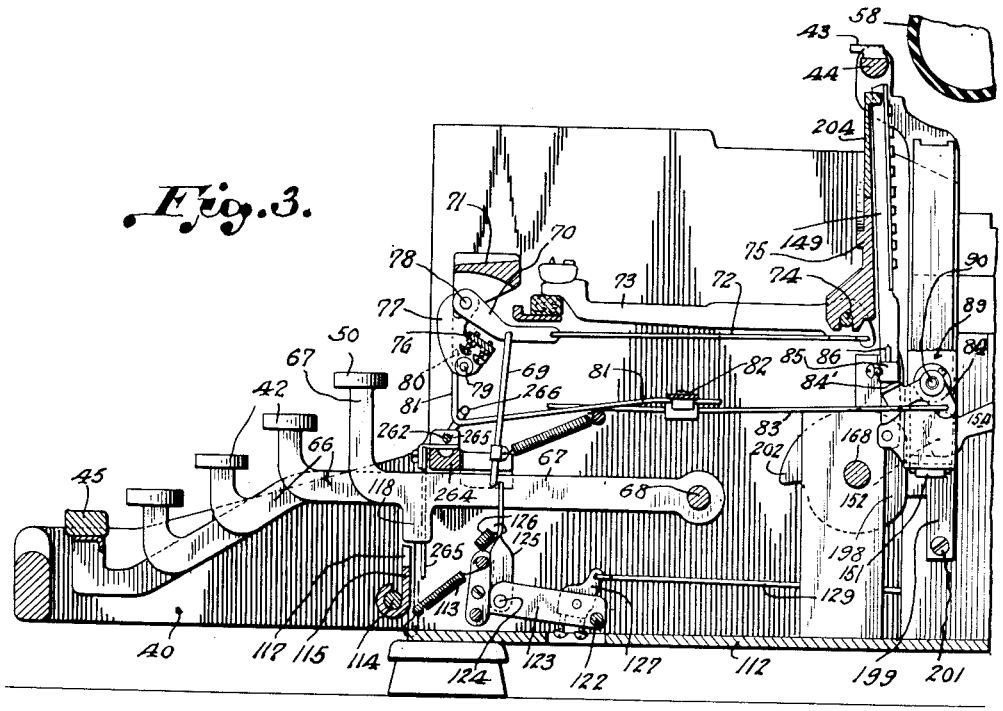
Fig. 3 is a vertical section taken substantially on the line 3—3 of Fig. 1.
Figure 10:
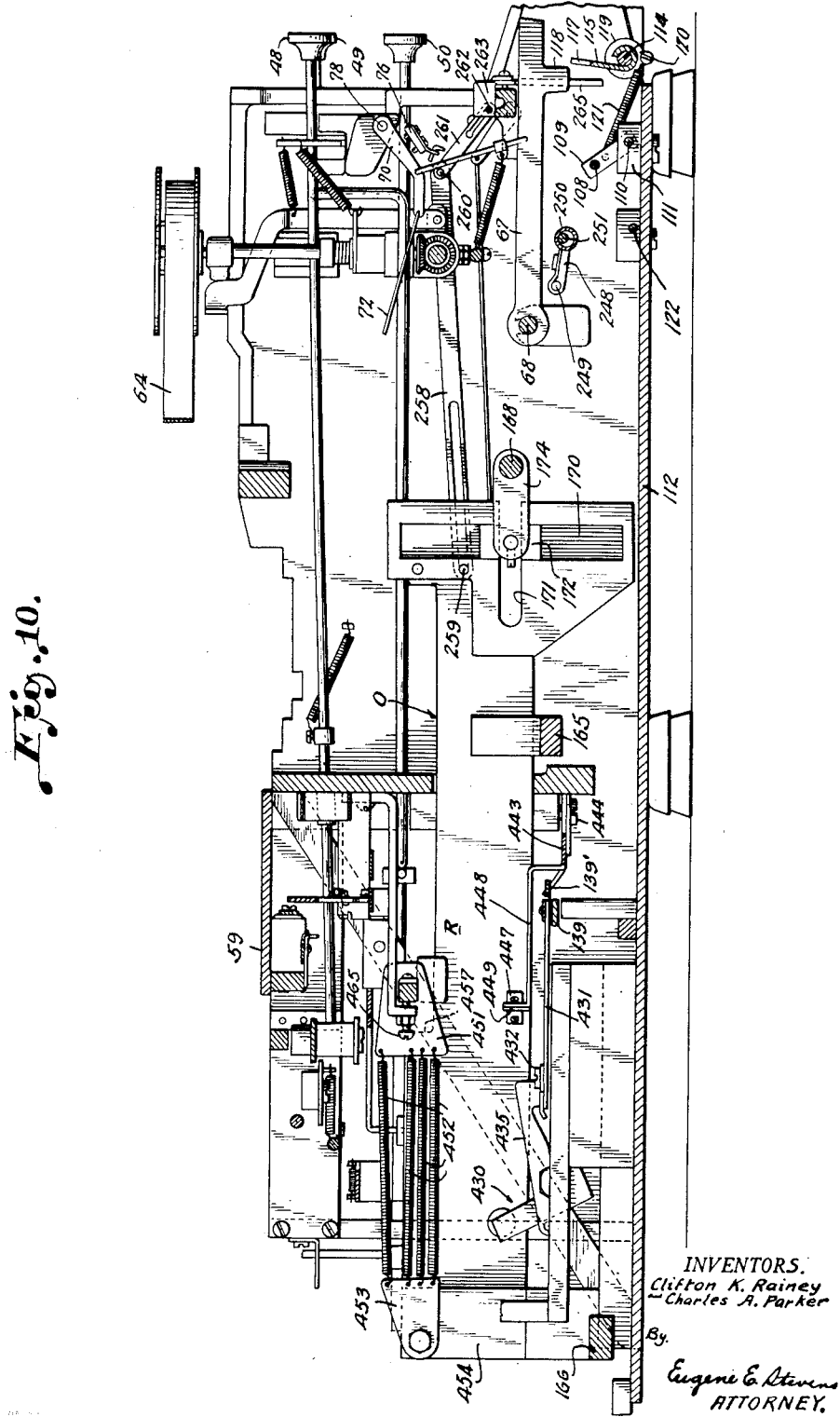
Fig. 10 is a vertical section substantially on the line 10—10 of Fig. 1.

With particular reference to Figs. 2, 3, 5, 10, 11 and 15, the mechanism for converting the numeral keys to adding type bar indexing means comprises a vertically oscillatable lever 91 that is pivoted at one end on a pivot stud 92 carried by an under portion 93 of the control plate 59. Substantially intermediate its ends this lever 91 has affixed thereto an upstanding detent 94 which projects upwardly through slot 95 in the control plate. The lever 91 is normally spring biased to an upward position in which, for substantially its full length, it underlies and contacts the under surface of the control plate 59. Spring means 96 attached to the control plate and to the lever functions to hold the lever in its normal upward position with the detent 94 fully projected upwardly through the control plate slot. The phase change mechanism P has at designated points along its mounting member 56 one or more lugs 57, one of which is shown in Fig. 15, which forces down the detent 60 as the carriage moves to the appropriate position. This results in depression of the detent lever 91, as shown in Fig. 15. At its free end the lever 91 has pivotal connection with a suspended link 98 which hangs vertically on the end of the lever and which is provided at its lower end portion with a closed end slot 99 that receives a pivot stud 100 on the rear end of one arm 101 of a bell crank lever that is pivoted at 102 to a depending support 103 which is secured at its upper end to the control plate 59. The other arm 104 of the bell crank lever has a pivotal connection 105 with the upwardly directed rear end of a pull rod 106 which extends horizontally forward in the machine assembly. The forward end of the pull rod 106 has a hooked slidable terminal 107 that is engaged over the upper bar 108 of a bail assembly comprising a pair of upright clevis members 109, one of which is shown in Fig. 10, which are connected transversely by a shaft 110 similar to and parallel to the upper rod 108. The shaft 110 is journalled in bearing blocks 111 mounted on the base plate 112 which extends entirely across the bottom of the main frame. The clevis members 109 are fixed on the ends of shaft 110 for rotation therewith; and the entire bail assembly is normally disposed in an upwardly and rearwardly inclined position, as in Fig. 5, when the lever 91 is in its raised position contacting the under face of the control plate. Spring means 113 connected between the upper bar 108 and points of attachment on the base plate forwardly of the bail assembly normally bias the bar 108 to rock the bail assembly counterclockwise with respect to Fig. 5 to assume the upright position indicated in Fig. 3. A shaft 114 journalled in the sides of the main frame beneath the bank of numeral keys has fixed thereto for rotation therewith a rocker plate 115 which normally is biased to an upright position, as shown in Figs. 2 and 3, through the action of a coil spring 116 that surrounds the right hand end of the shaft 114 in connection with the shaft and the adjacent side of the main frame. This spring 116 is a torque element constantly biasing the plate 115 to its vertical position. When in this position, the upper edge of the plate 115 underlies all the key levers and its upper edge is at an appropriate height to prevent a downward movement of the letter key levers 66 sufficient to carry their type bars to full strike position. At points along its upper edge underlying the numeral key levers 67 the plate 115 is vertically apertured to provide sockets 117 of a sufficient depth vertically from the upper edge of the plate to permit the numeral key levers to descend until arrested by contact of an integral depending lug 118 against the bottom of the appropriate socket 117. The numeral keys thus are permitted a limited movement sufficient for indexing purposes but insufficient to carry their type bars to striking position.

As best shown in Fig. 10, one end of the shaft 114 has fixed thereon an eccentric 119 which carries a lateral stud 120 that provides a point of connection for one end of a retracting spring 121 which connects at its other end to the adjacent clevis 109 at a point spaced slightly beneath the top bar 108. The normal bias of the spring 121 tends to pull the pivot stud 120 rearwardly or clockwise with respect to Fig. 5. It should here be noted that the combined force of the springs 113 and 121 is less than the force exerted by the spring 96 which holds the detent lever 91 normally in its elevated position against the bottom of the control plate 59. As the detent 60 is depressed, the operative bias of the spring 96 is counteracted and the bias of the springs 113 and 116 becomes effective sequentially to rock the bail assembly forwardly and thus relieve tension on the spring 121 which, in turn, permits the torsion spring 116 to function and to rock the shaft 114 to move the plate 115 into its vertical upright position. A shaft 122 extends transversely between the sides of the main frame rearwardly with respect to the bail shaft 110 and provides a pivotal mounting for the rear ends of forwardly directed cranks 123 which underlie the shanks of the numeral key levers. The forward end of each crank 123 has a pivotal connection 124 with an upwardly directed bifurcated member 125 which loosely straddles the under edge of the adjacent numeral key lever. A small spring 126 connects each bifurcated member 125 with the top bar 108 of the bail assembly and provides a bias normally urging the members 125 to upright position. The bias of the springs 126 is very slight and is sufficient only to assure that the elements 125 shall move forwardly to their upright positions when the bail assembly is moved to its vertical position as indicated in Fig. 3. Each crank 123 has mounted thereon an upstanding lug 127 positioned just forwardly of its point of pivotal mounting on the shaft 122. The lug 127 is shaped to dispose its upper end substantially in vertical alignment with the mounting shaft 122 when the parts are in the normal position of Fig. 5. Each lug 127 is rigidly attached to its associated crank 123 and is apertured at its upper end to receive in pivotal connection the forward terminal hooked portion 128 of a pull wire 129 that extends rearwardly in the machine assembly to a point of pivotal contact, one of which is shown at 130 in Fig. 7, with an associated bell crank lever 131 which functions to operate the mechanism of a stop pin box, generally indicated at 132, of conventional design.

A pull wire 129 extends from each of the numeral key lever-actuated crank lugs 127 and the rear end of each wire is connected to its appropriate bell crank lever which forms an operating part of the stop pin box mechanism. The one exception is the pull wire 129' from the numeral "9" key. This wire extends rearwardly to a point of pivotal attachment 133 with one arm of a bell crank lever 134 which rocks on its pivot 135 to exert a pull on a wire 136 which, in turn, extends transversely of the main frame assembly across the region of the calculating mechanism slide racks to a point of connection at its other end with one arm of a bell crank lever 137. The bell crank lever 137 operates in a conventional manner to actuate an escapement mechanism 138 of known design which functions to actuate a rack bar 139 to which the stop pin box 132 is secured, to impart movement to the stop pin box in the ordinary manner of stop pin box operation. The other pull wires 129 have individual connection with a universal plate 140, operative in the region of the stop pin box through a connection 141 with the bell crank lever 137, to actuate the stop pin box escapement mechanism each time one of the numeral key levers is depressed in its indexing function.

In the conversion of the numeral keys to their indexing function, the carriage C is arrested by tabulator means at the appropriate point to assure depression of the detent 60 as described. During the indexing operation the carriage is held against step-by-step movement because of the fact that no element which ordinarily would advance the carriage by its conventional escapement mechanism is given sufficient movement to be operated.

*Printing control from calculating unit*

The calculating unit, generally indicated as at A in Fig. 1, embodies a plurality of conventional calculator actuators, here shown as slides 142, one for each digit of the calculating unit, which reciprocate horizontally in a frame structure 143 that extends rearwardly from the rear end of the main frame 40 on the base plate 112. The frame 143 is so positioned relative to the general assembly that the printing point at the type guide 43 is disposed substantially between the second and third digits of the adding type bar assembly.

Each actuator of the calculating unit is provided with an abutment 144 positioned rearwardly of the stop pin box assembly for engagement by one of the stop pins 132', when positioned, so that forward movement of the actuator is arrested at the proper point determined by the numeral key. Common in the operation of adding machines generally, the zeros of the adding type bars all are brought to striking position at the start of a printing operation. In the machine of this invention the adding type bars are held against movement to striking position until the calculator actuators have moved beyond their zero position. Because of the fact that in the present machine a plurality of adding type bars are struck simultaneously by a hammer common thereto, means is necessary to prevent printing of zeros to the left of items printed by impact of the hammer. In machines in which the adding type bars are struck by individual hammers the withholding of type bars to the left is not necessary because those bars are not struck except when the appropriate hammer is actuated.

The machine incorporates in its stop pin box assembly the usual slide plate 145 between the stops 144 and shoulders 146 on the calculator slides. It is activated in the conventional manner from the stop box lug 147 which pivots the slide at 148.

A highly important feature of the invention is the flexible control of the adding type bar action from actuators of the calculating unit. At the start of a printing operation, the actuators move through a part of their travel independently of any operation of the adding type bars. At a predetermined point in the line of travel those actuators permitted to move beyond zero position engage and release spring biased latch means normally holding the adding type bars anchored against movement to striking position. This release is effective only as to the type bars associated with those calculator actuators which have moved beyond their zero position. All others are held against movement except the type bars to the right of any actuator that has gone beyond zero position. Actual movement of the released type bars to striking position is effected by means movable in response to a biase derived from movement of the operating frame.

Movement of the calculator actuators derives from that of the operating frame and is initiated through a spring bias that becomes effective upon the release of restraining means. The restraining means, herein embodied in an actuator restore bar, later described, is movable to release position by propulsion from the operating frame at a predetermined point in one direction of its travel. Propulsion of the restraining means acts against the tension of spring means biasing the restraining means to operative position. The bias of the spring means which urges the restraining means to operative position is utilized to return the adding type bars from printing position during movement of the operating frame in an opposite direction, jointly with restoration of the calculator actuators to initial position. The restraining means in moving back to its operative position acts through the calculator actuators to return the adding type bars toward their initial latched position. Modulating means operative from the restraining means acts at the same time on the type bar moving means to accelerate the movement of the adding type bars relative to that of the calculator actuators so that, when the operating frame comes to rest, the calculator actuators will be out of engagement with the adding type bar moving means, and the type bar moving means will again be latched to hold the type bars at the extreme limit of their travel out of printing position.

Each adding type bar comprises a shank 149 that is vertically slidable for reciprocation in the adding type bar frame 89, which includes a front plate and rearwardly extended side plates 150. Within the adding type bar frame there are disposed a plurality of followers 151 each of which receives in camming engagement the forward disk-shaped terminal 152 of its associated moving means 153, here shown as a bell crank actuator. One such actuator is provided for each adding type bar. It comprises a bell crank lever having a relatively long forward arm 154 and a shorter rear arm 155. The respective bell crank actuators 153 are pivotally supported from a shaft 156 that is mounted transversely in the frame 143. The arrangement of bell crank actuators, adding type bars, and followers, is substantially that as shown in the co-pending application of Clifton King Rainey, Serial No. 629,185, filed November 16, 1945, now Patent No. 2,496,357. The function of each bell crank actuator 153 is to shift its adding type bar 149 into and out of platen striking position. Normally, during index operation of the numeral keys, all adding type bars are in their lowermost position with their bell crank actuators 153 latched in the position indicated in Figs. 12 and 13. In this position of the parts the lift arms 154 of the actuators 153 are all held down by a transverse yoke 157 that straddles the upper edges of the crank lever arms. At each end the yoke 157 has fixed connection with a substantially triangular plate 158 that is pivoted at its apex portion on the shaft 156. The plates 158 with the attached holding down yoke are urged to move in a clockwise direction, with respect to Fig. 11, through the agency of a pull rod 159 that is pivotally connected at its forward end to the lower end portion of the triangular plate and which at its rear end has axially slidable connection with an element of the restore bar 160, later to be described. The rear ends of the rods 159 extend rearwardly beyond the restore bar and are provided with take-up adjusting means comprising nuts 161 threaded on the ends of each bar and bearing against a spacer sleeve 162 that contacts the restore bar, so that rearward movement of the bar 160 is transmitted to the pull rods 159 for pull down movement of the plates 158 and hold down yoke 157. The triangular-shaped plates 158 are normally urged to move counterclockwise with respect to Fig. 11 through the medium of a light spring 163 that is connected to one of the plates 158 and to a finger bracket 164 mounted in an element of the main frame.

After the adding type bars have been indexed by operation of the numeral keys, as previously described, the items provided by the indexing are ready for printing. This printing operation is accomplished during the cycling operation of a member mounted for reciprocation in the main frame and which transmits the necessary operating movement to the parts. This member, which is the operating frame O, consists of parallel side plates forming a right hand side plate R and a left hand side plate L which are spaced apart and connected as a rigid unit by a transversely extended front bar 165 and a transversely extended rear bar 166. This frame is reciprocated horizontally in the main frame between its limit positions in a cycling operation under the influence of an electric motor with clutch mechanism indicated generally at 167. The motor and clutch assembly is secured to the main frame preferably on the left hand side thereof, and when the motor is actuated by depression of the keyboard motor bar 46 it functions to impart rotation to a main drive shaft 168 that is journalled transversely of the main frame between the sides thereof. The drive shaft 168 is rotated in a clockwise direction with respect to Figs. 12 and 13. The side plates of the operating frame O are provided with forward end extensions to which are secured, on their inner faces, vertically disposed heads 169 each of which is formed with a vertical closed end slot 170. This slot is intersected intermediate its ends by a horizontal slot 171 that is closed at its rear end and open at its forward end into the vertical slot. The vertical slot constitutes a guideway for a cross head 172 which mounts a laterally extending stud 173 connected to a crank 174 secured to and rotatable with the driving shaft 168. With reference particularly to Figs. 10 and 11, it will be seen that as the main shaft 168 is rotated, the crank 174 through its cross head 172 acts to move the operating frame O horizontally forward relative to the front of the machine through one-half its operating cycle, and to move the frame horizontally rearward through the other half of its operating cycle.

With the parts in the position illustrated in Figs. 10, 11, 12 and 13, the operating frame O is at its rearmost limit and is in position for the initiation of an operating cycle. The front cross bar 165 of the frame has secured thereto a forwardly projected plate 175 that has a portion 176 inclined upwardly and forwardly to merge with a forwardly and horizontally directed lip 177 which at its forward end is formed with an integral upstanding ear 178. A separate retracting spring 179 is connected between the ear 178 and the short arm 155 of each bell crank actuator 153. The bias of this spring is such that as the operating frame moves forwardly during the first half of its cycle the spring is tensioned to bias the actuator 153 for rotation on its pivot in a direction clockwise with respect to Figs. 12 and 13. Rocking movement of the bell crank actuator for each adding type bar is normally prevented by latch means 180. In this embodiment of the invention this latch means comprises, for each adding type bar actuator 153, a thin planar finger that is flat in a vertical plane and which underlies its associated actuator 153 in vertical registry therewith. Each finger 180 is pivotally mounted at its rear end on a bearing shaft 181 that is supported at each end in a mounting bracket 182 which is in turn fixed to the adjacent side plate of the calculating unit frame 143. The shaft 181 extends transversely between the sides of the frame 143 and occupies a position slightly forward of the rear edge of the bracket 182. Each finger normally is urged upwardly to rock clockwise on its pivot, with respect to Figs. 12 and 13, through the bias of a spring 183 that is connected at one end to a transverse mounting bar 184 extending between and positioned in the brackets 182 beneath the bank of fingers. Each spring 183 at its other and rear end is connected to an ear 185 that depends from the rear end portion of its finger 180. Upward rocking movement of each finger has a limit position that is determined by the engagement of its flat upper edge against the bottom of a thin horizontal plate 186 that overrides the bank of fingers and which is secured at its ends in the brackets 182. Forwardly of the plate 186, which functions as a stop member, each finger 180 carries an upstanding detent 187 that is substantially triangular-shaped to provide an apex portion engageable in a complemental receiving socket 188 formed in the periphery of a disk-like cam head 189 on the lower end of the short arm 155 of the bell crank actuator. The apex portion of the detent 187 is inclined slightly rearwardly so that it functions, when engaged in the socket 188 of the bell crank actuator, as a positive latch which holds the bell crank actuator against movement on its pivot shaft 156. As best shown in Fig. 12, in this normal position of the parts the head 189 of the bell crank actuator arm 155 is disposed slightly to the rear of a vertical shoulder 190 constituting the rear vertical edge of an insert 191 that is secured between the front ends of a pair of horizontally extended parallel side pieces 192 which, at their rear ends, are secured to the opposite side faces of a forward extension 193 of the associated calculator actuator slide 142. The side members 192 provide between them a guideway for the disk-shaped head 189 of the bell crank actuator arm 155, so that there is no possibility of side sway during the operation of the bell crank actuator. These side members also provide a guide which confines movement of the finger detent 187 to a true vertical plane for cooperation with the actuator head 189.

The insert 191 at the front end of the side members 192 is provided with a forwardly directed ear to which is attached one end of a coil retracting spring 194 that is connected at its outer and forward end to the upstanding ear 178 of the plate 175 fixed to the front bar 165 of the reciprocable operating frame O. Normally, prior to the start of a cycling operation, the springs 179 and 194 are only slightly under tension. As the operating frame moves forwardly through the first half of its cycle these springs are placed under increasing tension. The tension on the springs 194 acts to pull forwardly, in the case of each spring, its associated calculator slide 142 until forward movement of the slide is arrested by the holding action of any of the different instrumentalities which may come into play to arrest forward movement of the slide at a proper point. One such arresting means may be a stop pin 132' set in the stop pin box by operation of the indexing means. Another such arresting means may be that which is inherent to the operation of the slides in connection with their associated rack mechanisms forming a part of the calculator mechanism.

When any calculator slide 142 is arrested during the course of its forward movement the continued independent forward movement of the operating frame then increases the tension on the associated spring 194 until the operating frame has reached the forward limit of its travel. In the case of those slides permitted movement beyond zero position by any of the different types of arresting means; that is, slides which function in the operation of printing an item, forward movement will continue under the pull of the springs 194 until the leading bottom edge of the appropriate insert 191 rides upon and cams downwardly the inclined upper edge 195 of an upstanding head 196 on the front end of each finger 180. As the camming action continues, the appropriate finger 180 will be depressed sufficiently to disengage its detent 187 from the associated socket 188 of the adding type bar actuator 153, whereupon, under the tension of the spring 179, the actuator will be rocked on its pivot to move the head 189 of its short arm 155 into contact with the rear vertical edge of the insert 191. Forward movement of the slide under the influence of its associated spring 194 continues to the point at which the movement of the slide is arrested by any of the arresting means previously described. When in finally arrested position, the slide is so disposed that its paired actuator 153 will have been rotated sufficiently on its pivotal support to elevate the cam head 152 of its long arm 154 to lift its associated adding type bar to its striking elevation for printing.

Particularly with reference to Figs. 16, 17, and 18, it will be noted that each finger 180, except that at the extreme left hand of the bank of fingers, is provided with a laterally directed integral plate lug 197 which immediately underlies the next adjacent finger of the series in the direction to the left, as viewed with respect to Fig. 17. The plate lugs 197 are staggered on their respective fingers, as shown in Fig. 16, so that there will be no interference in their operation. By reason of this construction it will be apparent that when any finger of the series to the left of the right hand finger, viewed with respect to Fig. 17, is depressed, it will in turn, through the chain of plate lugs on the other fingers, carry down with it all fingers to its right, so that their associated slides 242 may function by movement to their appropriate positions.

*Add type bar printing mechanism*

During forward movement of the operating frame O in the first half of its cycle, the main shaft 168 operating from the motor and clutch assembly, will have correspondingly rotated a pair of snail cams 198 affixed to the shaft for rotation therewith. The location of these cams is such that they are engaged with the forward edge portions of the hammer carrier levers 199 at their lower end portions. These hammer carrier levers 199, and the associated parts which function in the striking movement of the hammer and type bars in the printing operation, are disclosed in detail in the co-pending application of Clifton King Rainey, Serial No. 629,185, filed November 16, 1945. Briefly described, this mechanism includes a pair of the hammer carrier levers 199, each of which is pivoted intermediate its ends for oscillation in a vertical plane in the printing bar mounting frame 150, best shown in Fig. 25. At their upper ends the levers 199 are connected by the transversely extended hammer 44 which carries the type guide 43. The lower ends of the hammer levers are biased to move in a direction which imparts striking action to the hammer by the tension of coil spring means 200 connected between a point on the main frame and the intermediate portion of a cross bar 201 carried by and between the lower ends of the hammer levers. As the cams 198 arrive in proper position, their high points 202 slip past a shoulder 203 on the forward edge of each hammer lever and trigger the hammer levers for snap movement in a striking action under the influence of the spring means 200. This striking action of the hammer cannot take place until the adding type bars have been positioned for printing action under the influence of their respective bell crank actuators 153. One complete operating cycle of the frame O is effected simultaneously with one complete revolution of the main shaft 168. In consequence, when the high point 202 of each cam returns to its initial position, as shown in Figs. 12 and 13, a diametrically opposed dwell portion of each cam is engaged with the forward edge of each hammer lever 199 in a manner to position the hammer levers as shown in Figs. 12 and 13. In this position of the hammer and hammer levers, the hammer clears the platen so that normal operation of the letter keys may take place with the type bars striking through the type guide 43 without interference from the hammer.

*Aligning comb*

When the adding type bar actuators 153 have been operated, as described, to bring their respective type bars to the proper elevation for printing, mechanism is brought into play for moving the elevated type bars into true coplanar vertical alignment transversely of the frame so that the bars will print uniformly when they are struck by the hammer. This mechanism is best shown in Figs. 25, 26 and 27. When the adding type bars 149 arrive at their proper elevated positions they are angled upwardly and forwardly, as shown in Fig. 26, with their shanks leaning against the upper portion of the adding type bar comb 204. As the type bars are disposed at different elevations their angles of inclination against the comb 204 are different and, if they were struck by the hammer while in this position, the printing at the striking point would be irregular. In order to eliminate this possibility of irregular printing, the comb 204 is utilized as a means for bringing all adding type bars that are to be printed into proper coplanar alignment and printing position with respect to the platen, as shown in Fig. 27. By thus positioning the type bars immediately prior to printing, the hammer 44 is caused to strike all the bars at the same instant and with the same degree of force. If the type bars remained in the position of Fig. 26 it is obvious that the striking action of the hammer would not be uniform over all the bars to be printed.

The adding type bar supporting frame, generally indicated at 89, has its side pieces 150 connected at their upper ends by a rigid cross plate 205 extended transversely therebetween and secured thereto by threaded securing elements 206. This top plate 205 supports at each end a forwardly directed bearing plate 207 that is secured to the top plate by an appropriate threaded securing element 208. Each plate 207 is relatively small and is rounded at its forward edge to provide a fulcrum point 209 against which the rear face of the comb bears. The comb itself is loosely seated in the upper front edge portion of the type bar segment 75 and cooperates with the segment in providing a front plate assembly forwardly of the adding type bar mounting frame. The comb is loosely mounted with respect to the segment and, adjacent each fulcrum 209, is appropriately notched to provide for rocking on the fulcrum when the comb is shifted for positioning the type bars. In its normal position, as shown in Figs. 26 and 28, the comb is disposed flatly against the segment 75 and in a vertical position through the agency of biasing means, here shown as retracting springs 210. Each spring is disposed axially in a mounting bore 211 that extends through the upper end portion of each side bar 150 of the adding bar mounting frame. The bores 211 extend through the respective side pieces from front to rear and are open at their ends. The forward end of each bore 211 loosely receives the inner end of a shank 212 that is passed through a bore in the segment 75 and through a receiving bore in the comb 204. The head of the shank is enlarged, as at 213, and is disposed substantially in countersunk relation to the body of the comb with a loose fit. The spring 210 in each mounting bore is connected at its forward end to the inner end of the adjacent shank 212 and at its rear end to an anchor pin 214 mounted in the body of the side bar 150 and extended across the bore. The shank 212 with its head 213 in association with the spring provides a holding means loosely connected with the comb to permit movement of the comb relative to the holding means in the course of its operation. This holding means is biased to urge the comb normally in its vertical position bearing flatly against the front of the type bar segment. The rear face of the comb above the fulcrum plate 207 mounts a guard 215 which, as shown in Figs. 6, 8, 25 and 28, comprises a stiff wire directed across the rear face of the comb in parallel spaced relation thereto to provide a clearance for receiving the adding type bars between the wire and comb. This guard wire 215 has one end directed vertically downward and rounded, as at 216, to provide a bearing portion that is adapted to seat upon and rock on the fulcrum plate 207. The terminal of the rounded portion 216 is looped and is secured by appropriate fastening means 217 to the adjacent end of the comb. At its other end the guard wire 215 is secured in a mounting bracket 218 that is secured to the adjacent end of the comb. The bracket 218 is provided with an angle piece 219 which, in location and form, substantially registers transversely of the frame with the bearing 216 at the opposite end of the guard wire. The angle piece functions in the same manner as the bearing 216.

Figure 8:
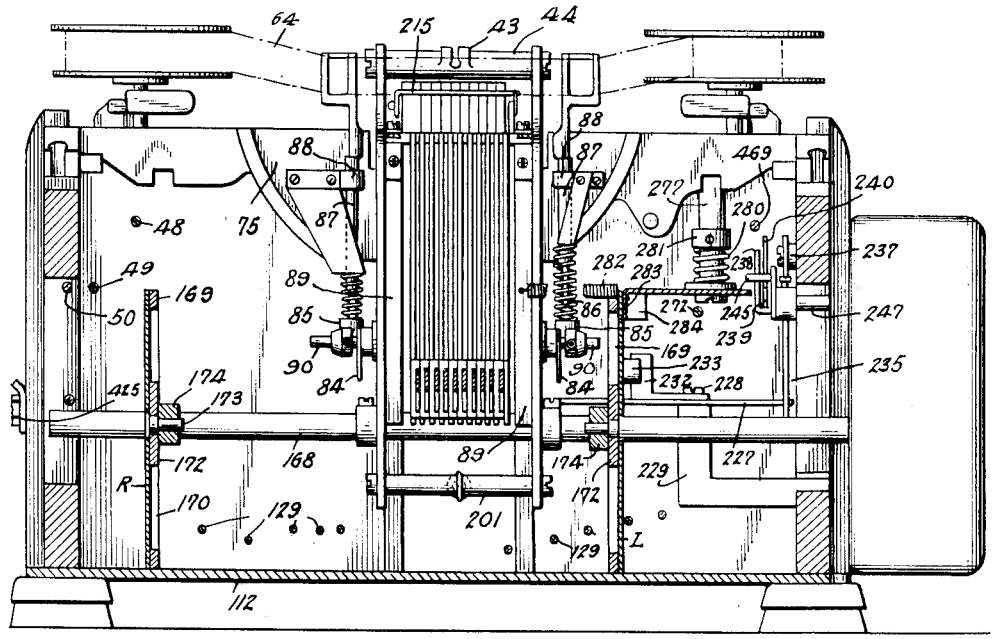
Fig. 8 is a vertical section substantially on the line 8—8 of Fig. 6.

The bracket assembly 218—219 is secured to the end of the comb by a securing element 220 that also functions as the securing means for the upper end of an arm 221 which extends rearwardly and downwardly from the rear face of the comb 204 at the left hand side of the type bar mounting frame between the adjacent side bar 150 and the left hand guide plate of the series of vertical guide plates disposed in the frame between the followers 151 of the bell crank actuators 153. The lower rear end of the arm 221 has rigidly secured thereto a laterally directed stud 222 which extends toward the left end of the type bar mounting frame and a slight distance therebeyond for pivotal connection as at 223 with a forwardly disposed link 224. The link 224 extends forwardly with respect to the frame assembly to a point beyond and forwardly of the type bar segment and hammer assembly and at its forward end has loose pivotal connection with a stud 225 mounted in a terminal bracket 226 on the end of a horizontally disposed lever 227. This lever 227 is an actuator that is pivoted intermediate its ends on a fulcrum element 228 mounted on the upper end of a bracket 229 secured to an element of the main frame. The mounting of the bracket 229 and the relationship of the parts with respect to the main frame is best shown in Fig. 8. The same fulcrum element 228 that provides a pivot for the actuator lever 227 also provides pivotal mounting for a horizontally oscillatable member 230 that is superimposed on the lever 227. The member 230 comprises a substantially triangular plate having a depending flange 231 that engages against the forward edge of the actuator lever. The plate also is provided on its rear edge with an upstanding flange 232 which is disposed vertically in the path of travel of a stud 233 carried by the head 169 of the left hand side plate L of the operating frame. Spring means 234 connects the plate member 230 with a point on the shank of the actuator lever 227 adjacent its end which has an operating connection with the link 224. The spring 234 is normally under tension sufficient to pull the plate 230 so that its depending flange 231 is held yieldingly against the forward edge of the actuator lever, as shown in Fig. 25. As the operating frame moves forward toward the end of its first half cycle, the stud 233 abuts the upstanding flange 232 of the member 230 and carries it forwardly to rock the member on its pivot. This action increases tension on the spring 234 to the point at which the spring itself pulls the lever 227 to rock on its pivot and thus pull the link 224 forwardly to effect rocking movement of the comb 204 on its fulcrum point 209. As previously described, when the comb is thus rocked on its fulcrum it assumes the position shown in Fig. 27 and its upper edge portion carries the elevated adding type bars rearwardly into proper coplanar position for striking against the platen.

It sometimes happens in the operation of bookkeeping machines that too great a thickness of paper is interposed between the platen and the type bars and this normally tends to jam the mechanism concerned with the rocking action of the comb, as the type bars cannot move to their true vertical position for striking. Should this happen, the forward movement of the link 221 would move the lower portion of the comb outwardly and forwardly, but due to the position of the type bars the comb would be separated from its fulcrum point 209 in a lateral and forward direction. At this point no breakage of parts could occur for the reason that the comb would then fulcrum on the type bar and would be held against slippage out of position by the engagement of the portion 216 of the guide bar and the angle member 219 against the upper surface of the fulcrum plate 207. The entire comb assembly would thus be held in its proper relationship with the rest of the mechanism although it would be permitted to give against the tension of the springs 210. In turn, this yielding play of the parts would be reflected in further tension on the spring 234; so that under any conditions of jamming the parts could not move or be forced beyond their point of movement as limited by the strength of spring 234. When the tension on the springs is released, either by a removal of the jamming cause or by a return of the operating frame-carried member 233 to its initial position, the tilted comb would be guided back to its position of engagement on the fulcrum point 209 by reason of the guiding action of the curved portion 216 of the guide wire through its engagement against the top of the fulcrum plate 207. Even though an undue thickness of paper at the printing point should result in the movement of the comb so as to separate it from its fulcrum point 209, the upper rear edge of the comb would still position the type bars in true lateral registry for uniform impact by the hammer 44 when it is brought to striking position.

Motor clutch trip mechanism

The actuator lever 227 has a further function in that it conditions the motor and clutch drive against operation through more than one cycle even though the motor bar be held depressed through a period of time beyond that required for one complete cycle of the operating frame. In the performance of this function the lever 227, when it is rocked on its fulcrum by forward movement of the operating frame-carried member 233, engages against and forces rearwardly a depending arm 235 of a bell crank 236 that is pivoted at 237 on an element of the main frame. The bell crank 236 is formed with a rearwardly extending short arm 238 which has a terminal portion that is directed laterally and upwardly to provide a keeper 239 which straddles the bottom edge of a throw link 240. The throw link 240 is freely slidable in the keeper 239 for reciprocation under the motivating force of an arm 241 that is pivotally connected as at 242 to the forward end of the throw link. At its rear end portion the throw link is longitudinally reduced to provide a straight edge 243 which terminates in a shoulder 244 spaced inwardly from the rear end of the link. Normally, the straight edge 243 of the throw link rides upon a lateral stud 245 carried by a clutch control member 246 that is fixedly connected to a clutch-operating shaft 247 which extends through the adjacent side of the main frame and forms a part of the motor and clutch mechanism generally designated at 167. When the bell crank 236 is rocked in a counter-clockwise direction with respect to Fig. 29, under the influence of actuator lever 227, the keeper 239 is elevated sufficiently to clear the shoulder 244 of the throw link with respect to the clutch operation stud 245, so that when the throw link 240 is moved rearwardly the stud 245 is below its path of travel and consequently is not engaged by the shoulder. Thus, should the motor bar 46 be depressed for a period longer than that of a normal operating cycle of the operating frame, the throw link 240 will be disabled with respect to the clutch operator 246 and will in consequence prevent any recycling operation of the operating frame.

Figure 5:
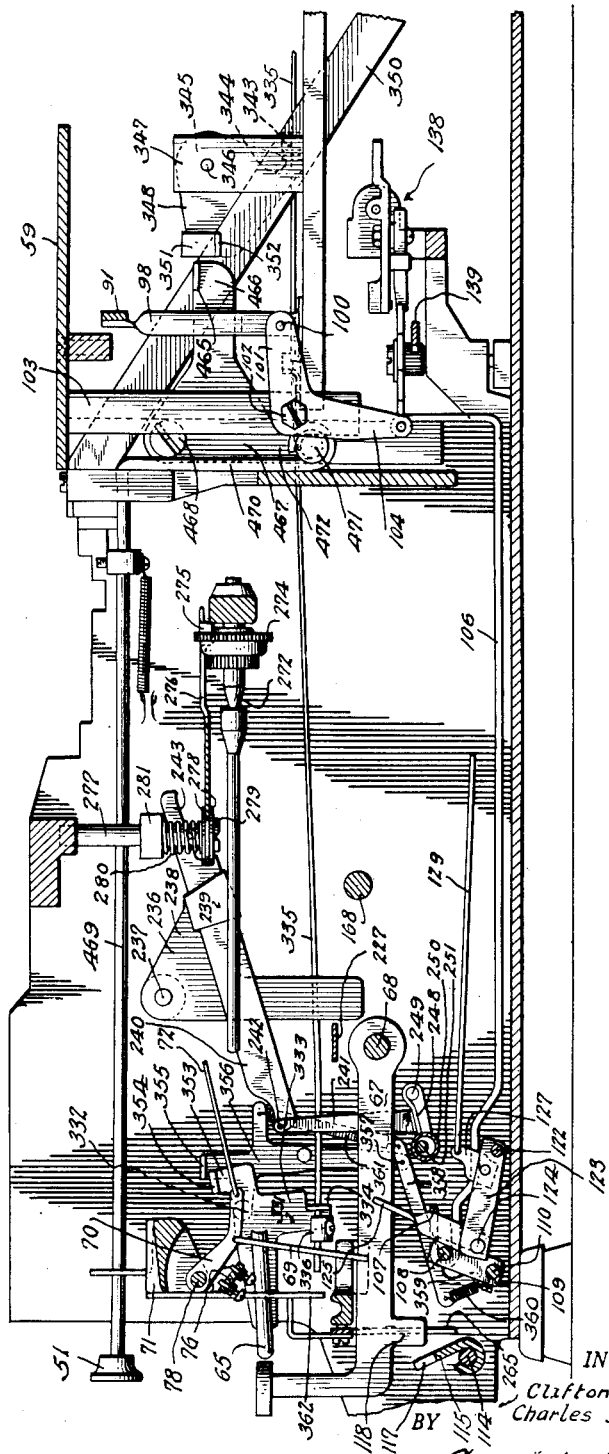
Fig. 5 is a vertical section substantially on the line 5—5 of Fig. 1.
Figure 6:
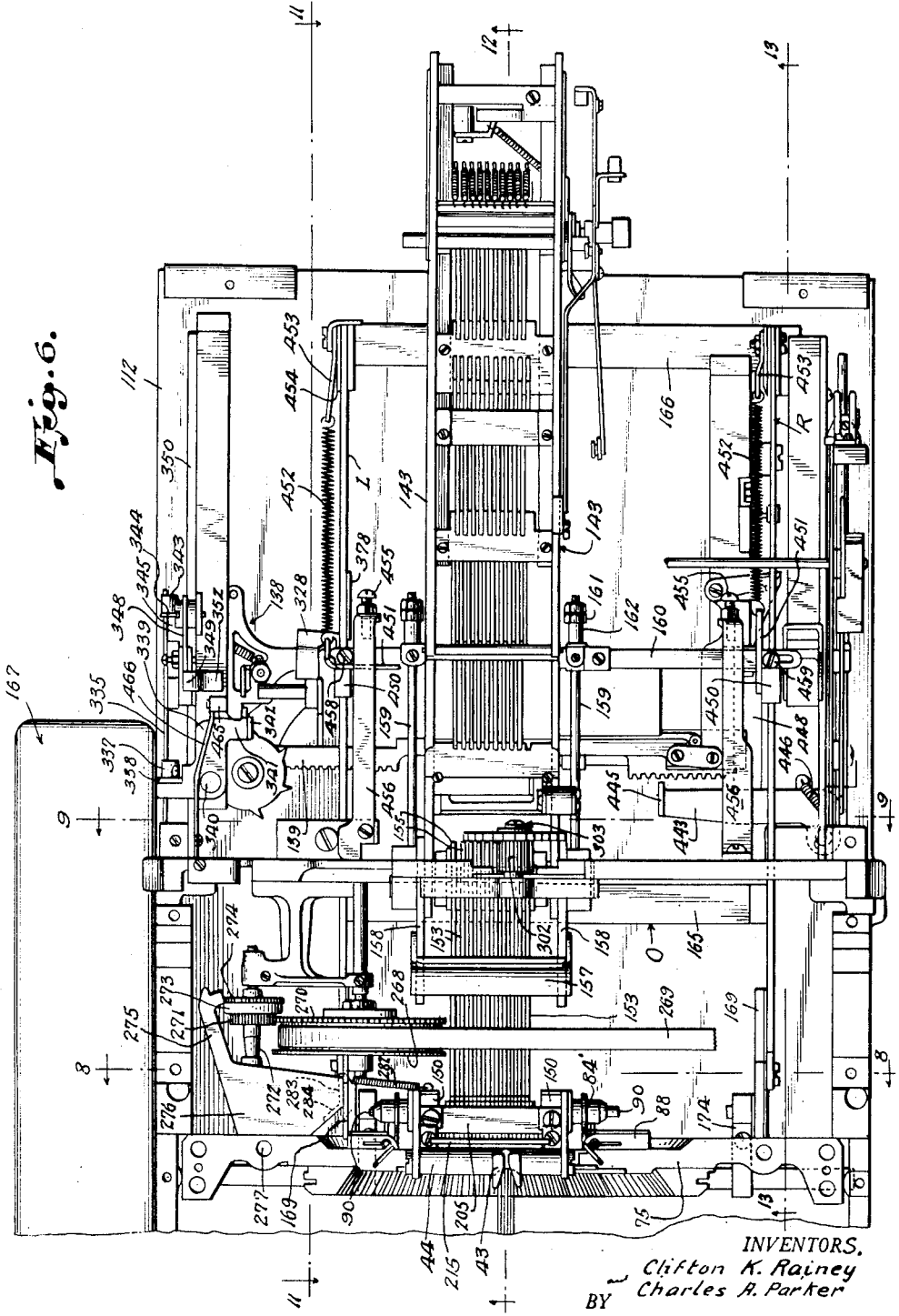
Fig. 6 is a horizontal section substantially on the line 6—6 of Fig. 2.

The arm 241 which motivates the reciprocatory movement of the throw link 240 extends vertically downward beneath the front end of the link and connects at its lower end to a bail member 248, see Fig. 5, that has fixed connection to one end of a shaft 249 which is disposed transversely of the main frame in journal bearings disposed in elements of the main frame. Two of the bail members 248 are employed, one at each end of the shaft. Each has a forward portion formed as a laterally disposed tube 250 that extends transversely between the bail and which loosely receives a reinforcing rod 251 disposed transversely of the main frame between the bail members. By reason of this construction, actuation of the arm 241 derives from depression of the motor bar 46. This bar is pivoted intermediate its ends on the main frame as at 252, see Fig. 2, so that when it is manually depressed its inner end 253 is lifted. A spring 254 is connected between a point on the end of the bar 253 and to the rod 251. Normally, this spring 254 is under a light tension sufficient to lift the tube 250 so that it is engaged beneath the bottom edge of the rear end 253 of the motor bar. This engagement by the motor bar holds the actuator arm 241 in its extreme forward position with the throw link 240 advanced so that its shoulder 244 is disengaged from the clutch operator stud 245. When the motor bar is depressed to lift its rear end, the tension on spring 254 is increased. This increasing tension results in an upward pull on the tube 250 which, in turn, rocks the bail members 248 and their shaft 249 to swing the upper end of the actuator arm 241 rearwardly and move the throw link 240 to the point at which its shoulder 244 engages the stud 245 and actuates the clutch operator 246. The motor and clutch assembly then accomplishes an operating cycle of the operating frame. When pressure on the motor bar is released the bar and its associated mechanism previously described returns to initial position by reason of the bias of a spring 255 connected between a point on the rear end of the motor bar and a stud 256 that is carried by the key lever pivot shaft 68. This stud extends diametrically through the shaft 68 into an element of the main frame and thus is anchored rigidly with respect to the assembly. The point of connection of the spring 255 with the rear end of the motor bar is above its point of connection with the stud 256, so that the action of the spring 255 tends to pull the rear end of the motor bar down in restoring the bar to its initial position. A stud 257 mounted in the main frame extends laterally beneath the adjacent bail member 248 and limits downward movement of the member and consequently downward movement of the rear end of the motor bar 253.

A further feature of the construction just described is the engagement of the tube 250 against the bottom edges of the key levers when the bails 248 are rocked upwardly under the influence of the spring 254 following depression of the motor bar. This upward movement of the rod 251 transmits a lifting force against the key levers and this force, although slight, is evidenced to an operator in the feel of the numeral keys. The machine of this invention enables operation of the numeral keys with both hands. In the necessarily rapid action which results from such use there is a tendency to trip the motor bar while the numeral keys are still rising to their upper limit following depression. Should this happen, the elevation of the rear end of the motor bar acting through the spring 254 and the tube 250 actually flips the numeral keys upwardly so that, in effect, the operator's fingers are lifted without conscious effort. Should a numeral key be in the course of downward movement or at a point at which its upward movement has not started at the time the motor bar is depressed, the manual force exerted downwardly on the key will be sufficient to hold down the tube 250 while at the same time the rear end of the motor bar rises. The only effect would be to increase tension on the spring 254 and the net result would be that the motor bar, even though fully depressed, could not actuate the motor until the depressed key had been returned to its up position. The tube 250 functions to prevent operation of the motor even in the course of a straight typing operation if it should happen that the motor bar were accidentally depressed.

*The ribbon movement*

In the operation of the machine as a typing machine, the ribbon is lifted by operation of the lift elements 84 that are actuated in the manner previously described from the pull wires 83 under the influence of the universal bar 76. Means also is provided to operate the ribbon lift by power derived from the operating frame in its cycle of movement. This means comprises a slotted link bar 258 that is slidably attached at its rear end over a lateral stud 259 on the right hand side plate R of the operating frame. At its forward end the link has a pivotal connection 260 with a crank arm 261 which at its forward end is rigidly secured to the end of a rod 262. The rod 262 is journalled in supporting brackets 263 that are secured to a transverse element 264 of the main frame which mounts the usual key lever comb 265. With particular reference to Figs. 3 and 4, it will be seen that the rod 262 extends from the right hand side of the frame to substantially the mid-point of the type bar assembly where it is passed through its supporting bracket 263 and then upwardly and longitudinally upon itself to provide a keeper 266 which engages over the underlying bend in the rod 81 that depends from the universal bar. Normally, the link 258 is urged forwardly by the bias of a spring 267 that connects between a point on the link and a point of attachment on the main frame of the machine. In the normal typing operation of the machine, when the universal bar 76 is actuated through operation of the keys, the rod 81 is shifted forwardly to act through the wires 83 for operation of the ribbon lift, previously described. During this operation the keeper 266 remains in its upwardly and rearwardly inclined normal position in which it is held by the position of the link 258 with respect to its point of attachment to the operating frame. It should here be noted that the stud 259 is headed to hold the link 258 in association with the operating frame and the shank of the stud plays in the link slot as the operating frame comes forward in the first half of its cycle. When the operating frame is moving forwardly the stud 259 rides in the slotted link 258 and allows the link to move forwardly under the pull of the spring 267. This movement is transmitted through the crank 261 to the rod 262 and this rod is rocked to shift the keeper portion 266 forwardly into engagement with the rod 81. The keeper 266 moves forwardly to impart the same movement to the rod 81 that normally is imparted by operation of the universal bar in the course of a typing operation. In consequence, the rod 81 moves forwardly and exerts a pull on the wires 83 so that the ribbon is lifted into proper position for printing. As the operating frame moves rearwardly in the second half of its cycle the stud 259 engages in the end of the slot in the link 258 and pulls the link rearwardly to rock the rod 262 back to its initial position, as shown in Fig. 3, which allows the ribbon to descend.

Figure 9:
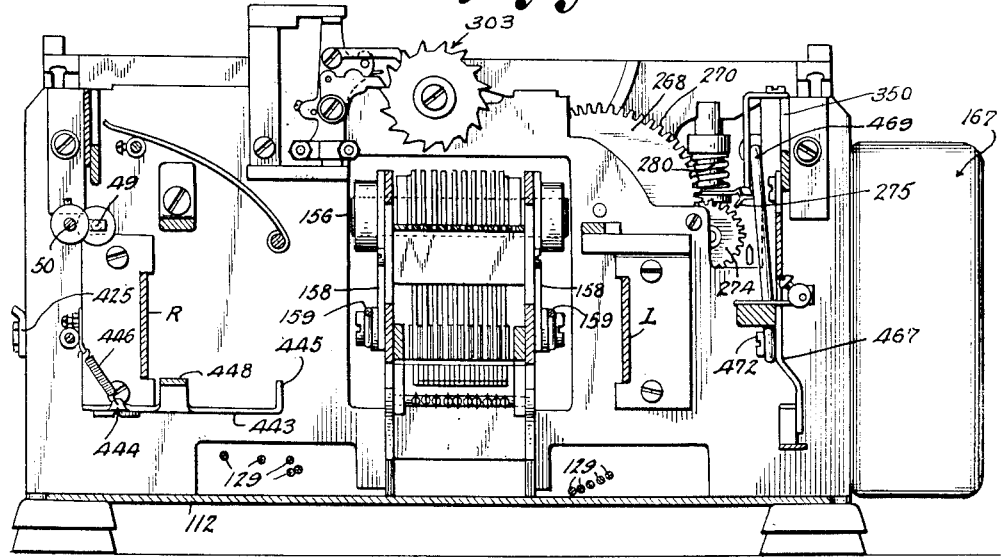
Fig. 9 is a vertical section substantially on the line 9—9 of Fig. 6.

The ribbon has its usual winding mechanism including the conventional spring drum 268 to which is attached the carriage draw band 269. The spring drum carries the usual gear 270 that is meshed with the pinion 271 mounted in the usual manner on the conventional ribbon wind drive shaft 272. The pinion 271 is associated with the conventional pawl and ratchet drum 273 which, in this embodiment of the invention, has affixed thereto for rotation therewith a gear 274. This gear 274 cooperates with an actuator pawl 275 carried by a horizontally disposed rocker plate 276 that is pivoted as at 277 to an element of the main frame. As best shown in Fig. 5, the pivot 277 comprises a vertical shaft anchored at its upper end in a portion of the main frame and provided at its lower end with a pair of supporting washers 278 that engage opposite faces of the rocker plate 276. It will be understood that the rocker plate is apertured to receive the lower end of the shaft 277 so that it may rock freely thereon. The lowermost washer 278 is held against an abutment 279 fixed to the lower end of the pivot shaft and the upper washer is normally urged downwardly against the rocker plate by the action of an expansion spring 280 mounted about the shaft between the washer 278 and a collar 281 anchored on the shaft. This arrangement permits the plate 276 to yield vertically for the appropriate lifting movement necessary to accomplish its operative engagement with the gear 274. With reference to Fig. 9, it will be seen that the pawl 275 has a downwardly directed engaging tip that cooperates with the teeth of the gear 274. In its disengaged position this tip is removed from the teeth, and its point of engagement with the teeth of the gear is disposed below a horizontal plane tangential to the periphery of the gear at its uppermost point with respect to the main frame. As the pawl engages the teeth of the gear 274 it moves laterally to the left with respect to Fig. 9 under the influence of a spring 282 connected between an edge of the rocker plate and the adjacent side bar 150 of the adding type bar mounting frame. During the course of this movement the pawl rides upwardly and over with respect to the gear 274 and follows the same cycle in its return movement. The necessary vertical play is permitted by the arrangement of washers 278 and spring 280.

In the normal position of the parts, with the operating frame at its rear limit of travel, the head 169 of the left hand frame side plate L provides an abutment that is engaged by a vertically depending flange 283 integral with the rocker plate 276. This engagement precludes any movement of the rocker plate under the influence of the spring 282, so that the pawl 275 is held out of engagement with the ribbon wind gear 274. As the operating frame moves forwardly in the first half of its cycle the head 169 clears the flange 283 and permits the rocker plate 276 to snap over under the influence of the spring 282 to engage its pawl 275 with the ribbon wind gear 274 and impart partial rotation to the ribbon wind shaft 272 for advancement of the ribbon. Upon return of the operating frame in the second half of its cycle the head 169 engages against and cams an inclined downwardly extending flange 284 integral with the rocker plate forwardly of the flange 283. The result of the camming action as effected rocks the plate 276 to the left, as viewed in Fig. 6, so that the rocker plate pawl is disengaged from the ribbon wind gear mechanism. The vertical play of the plate 276 permits the pawl 275 to function as a ratchet in the course of its movement.

*The tabulator mechanism*

The tabulator mechanism, see Fig. 31, includes a conventional tabulator bar 47 that is pivoted at its inner end on a lateral stud 285 extending from an element of the main frame. The rear end of the tabulator lever has an upstanding portion 286 that has pivotal connection as at 287 with the hooked forward end of a pull wire 288 which extends rearwardly in the frame adjacent the left hand side. The rear end of the wire 288 is hooked for pivotal engagement under a lateral pivot stud 289 carried by a rocker arm 290 that is pivoted for oscillation in a vertical plane on a pintle 291 that is mounted in a depending support 292 rigidly secured at its upper end to an element of the control plate 59. The rocker arm 290 is substantially Y-shaped with the fork of the Y upwardly of the pintle 291 and the shank portion extending rearwardly and downwardly in the normal position of the parts. One fork 293 of the rocker arm, which is the lower fork viewed with respect to Fig. 31, has a pivotal connection 294 with a link 295 that is pivotally connected at its upper end to a laterally extended lever 296, best shown in Fig. 32. The lever 296 is pivoted intermediate its ends to oscillate in a vertical plane on a shaft 297 that is journalled for rotation in mounting elements fixed to the under part of the control plate 59. The upper free end of the lever 296 is formed with a flat bearing portion 298 which normally contacts the under face of a bar 299 that extends longitudinally of the carriage assembly and which carries a carriage rack 300. This assembly of rack and bar extends longitudinally of the carriage and is pivoted at each end on the end casting 301 of the carriage so that when the bearing portion 298 is elevated the bar 299 is rocked on its pivot to lift the rack bar 300 out of its normal engagement with the teeth of the pinion 302 which is a part of the conventional escapement assembly indicated generally at 303, best shown in Figs. 6 and 9. When the tabulator bar 47 is manually depressed the pull wire 288 is drawn forwardly to rock the arm 290 on its pintle and depress the link 295 which, in turn, swings the lever 296 on its pivot to lift the bearing portion 298 and release the rack as described.

Concurrently with actuation of the lever 296, mechanism is operated to elevate the tabulator pawl 61, previously described, and also shown in Fig. 11. This mechanism includes a crank 304 that is fixed to the shaft 297 for rotation therewith. The crank 304 lies flatly alongside the lower portion of the lever 296 and carries a laterally directed pin 305 that overrides the upper edge of the lever. This pin anchors one end of a retracting spring 306 which at its other end is secured to a pin 307 on the lever. The normal tension of the spring 306 biases the lever 296 upwardly against the crank pin 305. When the lever is depressed a pull is exerted through the spring 306 which conjointly carries down the crank 304 to rock the shaft 297. This rocking action of the shaft 297 is counterclockwise with respect to Figs. 33 and 34.

With reference to Fig. 33, which shows the tabulator pawl in depressed unlatched position, it will be seen that the shaft 297 has fixed thereon for movement therewith a crank 308 which extends beneath the control plate 59 to the region of the slot in which the pawl 61 is mounted. The free end of the crank 308 is bifurcated to receive in slidable engagement a pin 309 carried by the shank of the pawl and extending laterally therefrom. As the shaft is rocked counterclockwise with respect to Fig. 33, engagement of the bifurcated end of crank 308 with the pawl-carried pin will lift the pawl to its elevated position, as shown in Fig. 34. Adjustable means 310 is carried by the crank for cooperation with the under face of the control plate to determine the limit of upward movement of the pawl. The upper end portion of the pawl shank is formed with a lateral enlargement providing a shoulder 311, the edges of which are squared. Normally, in the depressed position of the pawl, the vertical edge of the enlargement is engaged against the adjacent end of the pawl-receiving slot in the control plate. When the pawl rises under the lifting action of the crank 308 mechanism is permitted to function which shifts the pawl longitudinally with respect to the control plate so that the bottom edge of the enlargement 311 overrides and seats upon the upper face of the plate. In this position the pawl is latched against depression.

This shifting mechanism comprises a longitudinally reciprocable bar 312 that is provided with spaced longitudinally disposed slots 313 and 314 which receive laterally therethrough the shaft 297 and a fixed shaft 315, both of which are mounted transversely between a pair of supporting blocks 316 and 317 secured to the under face of the control plate longitudinally thereof in forwardly and rearwardly spaced relation relative to the assembly of detents 60—63 shown in Fig. 11. Adjacent the right hand end of the block 317 there is provided a member 318 secured to the control plate and which forms a point of anchorage for one end of a retracting spring 319 that is connected at its other end to the adjacent end of the reciprocable bar 312. The spring 319 provides a bias constantly urging the bar 312 to the right, as viewed with respect to Figs. 33 and 34. This bar 312 carries in fixed relation a pair of side plates 320 and 321 that are spaced apart longitudinally of the bar to provide a vertical guide channel in which the shank of the pawl 61 is slidable. When the activating force on the shaft 297 and crank 308 is removed, as when an operator releases the tabulator bar, the pawl remains in its latched position by reason of the holding action of the shoulder 311. In this latched position the crank 308 is held in its elevated position and as the crank is fixed to the shaft 297, this shaft is, in turn, anchored against rocking; so that its crank 304 acts through the stud 305 to hold down the adjacent portion of the rack lifting lever 296. The bearing portion 298 of this lever remains in elevated position holding the rack bar out of engagement with the teeth of the escapement mechanism, so that the carriage is free to move under its draw band actuation until a tabulator stop lug, one of which is shown at 57 in Fig. 31, engages the vertical edge of the tip 61' of the pawl. When this engagement occurs the momentum of the carriage acts to shift the pawl to the left, with respect to Fig. 34, so that its shoulder 311 moves out of engagement with the control plate and the pawl is positioned so that it can move downwardly to its unlatched position upon actuation by the appropriate mechanism. When the pawl is disposed in its depressed unlatched position the rear vertical edge of its shank abuts the adjacent vertical edge of the plate 320 which, in turn, has an upstanding portion 320' that fills the space between the edge of the pawl shank and the adjacent end of the pawl-receiving slot 95 in the control plate. The portion 320' constitutes a reinforcing element which assists in absorbing the striking impact of the carriage-mounted tabulator stop. Usually, when the carriage is moving to carry the tabulator stop into engagement with the pawl, there is a forcible striking action of the tabulator stop against the pawl. The strain thus imparted to the pawl tends to angle the pawl in its guide channel between the plates 320 and 321. This angling strain is transmitted to the walls of the guide channel as a spreading action which is, of course, resisted by the anchorage of these plates with respect to the bar 312. At the same time the strain on the pawl is transmitted through the extension 320' so that the blow is taken up through this extension by the adjacent end of the pawl-receiving slot in the control plate. The presence of this reinforcing portion 320' between the edge of the pawl shank and the adjacent edge of the control plate slot further takes up the striking impact and eliminates any possibility of the pawl-carried pin 309 forcing the link 308 laterally to impart a strain on the mounting of the shaft 297.

When the pawl 61 has been struck by a carriage tabulator stop and is shifted out of its latched engagement with the control plate it is of primary importance that the carriage rack 300 be engaged as quickly as possible with the teeth of the escapement pinion 302, in order that the carriage shall be positioned as precisely as possible. Due to the pull of the carriage draw band, the pawl and the upstanding reinforcing portion 320' of its guide plate are forced against the adjacent end of the control plate slot so strongly that considerable friction is engendered which resists, in the manner of a brake, downward movement of the pawl. This resistance tends to slow down the reengaging action of the carriage rack with the escapement and to retard it sufficiently with reference to the drop of the pawl to permit some further movement of the carriage beyond its desired point of stoppage. In conventional practice reliance is placed upon the action of relatively strong springs mounted between some fixed element of the frame assembly and an element of the tabulator bar actuating mechanism. The spring action is somewhat retarded, so that the precise stoppage of the carriage is affected. In the present invention, this conventional practice is not followed, and means is employed that imparts a constant bias to the carriage rack which results in the reengagement of the carriage rack with the escapement pinion simultaneously with downward movement of the pawl 61 to its fully depressed position. This means comprises a pair of springs 322, one at each end of the carriage, connected between a point of anchorage on the carriage casting 323 and a bracket 324 fixed to the rack 300 and its mounting bar 299. The bias of the springs 322 is acting constantly to urge the rack into escapement-engaging position but its bias is resisted, so long as the pawl 61 is elevated, by the holding action of the elevated portion 298 of the lever 296. When the pawl is latched in its elevated position there can be no actuation of the lever 296 on its fulcrum shaft 297 such as to lift the pin 305 and consequently the crank 304 to rock the shaft 297. This holding action transmitted through the lever 296 would prevent rocking of the shaft 297 to a movement, clockwise with respect to Figs. 33 and 34, sufficient to depress the tabulator pawl. As soon as the impact of the carriage tabulator stop has shifted the pawl 61 so that its latching shoulder 311 disengages the control plate, the full force of the springs 322 is immediately effective to carry down the bearing portion 298 and rock the lever 296 to rock the crank 304 upwardly and, through the medium of the shaft 297, thus immediately pull the pawl down to its fully depressed position. This action of lowering of the pawl and reengagement of the carriage rack with the escapement mechanism occurs simultaneously, so that the carriage is arrested at the precise point desired.

While the tabulator pawl 61 is latched in its elevated position the rocker arm 290 is held in the position to which it is moved by depression of the tabulator bar. When the pawl moves down to its depressed position the chain of mechanism previously described operates to lift the link 295 and rock the arm 290 on its fulcrum point 291 to restore the rocker arm to its initial position prior to depression of the tabulator bar. A light spring 325 is connected between a point of anchorage on the block 316 and the high point of the rocker arm 290. The function of this spring is merely to retain the parts against lost motion and loose play, especially when the conventional rack-elevating mechanism of the carriage is manipulated.

The tabulator mechanism, in this embodiment of the invention, is arranged for actuation by cycling movement of the operating frame. In furtherance of this actuation the shank of the actuator arm 290 which extends downwardly and rearwardly as shown in Fig. 31, has a laterally directed end portion 326 which is directed inwardly with respect to the frame assembly, as best shown in Fig. 32. This end portion has a cam tip 327 that is angled upwardly and forwardly in diverging relation with respect to the shank of the arm 290. This cam portion 327 normally is disposed in the path of travel of an abutment 328 mounted on the left hand side of plate L of the operating frame. As the operating frame moves forward through the first half of its cycle the abutment 328 cams against the tip 327 and displaces the entire rocker arm 290 laterally with respect to its support 292. In order to permit this lateral displacement, the pivot stud 291 is passed through the support and through the rocker arm and carries an attached washer 329 which anchors one end of a coil expansion spring 330 that bears at its other end against the face of the rocker arm. The spring 330 permits lateral displacement of the rocker arm 290 against the bias of the spring, and when the operating frame-carried abutment 328 passes forwardly beyond the cam tip 327 the bias of the spring returns the arm 290 laterally to its initial position. Upon return movement of the operating frame in the second half of its cycle the abutment 328 engages the tip 327 and rocks the arm 290 on its fulcrum point 291 to accomplish the setting of the tabulator pawl 61 in the same manner as the setting is accomplished by manual depression of the tabulator bar, as previously described. In the continued rearward movement of the operating frame the abutment 328 moves rearwardly from and disengages the cam tip 327 of the rocker arm and the arm then returns to its initial position in the course of the downward movement of the tabulator pawl, as previously described.

Provision is made for disabling the tabulator mechanism against operating frame actuation, but not against manual operation, when the machine is conditioned for use as an adding machine. In thus conditioning the machine the function control lever 65 is lifted from its intermediate posting position shown in Figs. 4 and 5 and is shifted to its uppermost position. In moving to its uppermost position the lever carries with it an attached bell crank operator 331. This bell crank operator, best shown in Fig. 5, pivots on a stud 332 and is mounted in an element of the main frame. The operator has an integral depending arm 333 which carries an integral laterally directed ear 334 that is slidable over and upon a pull wire 335 which extends rearwardly in the frame assembly to a point of connection with mechanism, later described, which operates to disengage the tabulator mechanism relative to operating frame actuation. The forward end portion of the wire 335 has affixed thereto a collar 336 which provides an abutment that is engaged by the operator-carried ear 334 when the function control lever is lifted to its uppermost position. Movement of the lever rocks the operator on its pivot to move the ear 334 forwardly to a position of engagement with the collar 336. Forward movement of the ear 334 carries with it the collar 336 and imparts a pull to the wire 335. Mounted on the wire 335 at a point substantially in the lateral zone of the rocker arm 290 of the tabulator mechanism is a fixed collar 337 which, as the wire is pulled forwardly, engages against and pushes forward an upstanding ear 338 that is integral with the bell crank lever 339 which is pivoted as at 340 for oscillation horizontally in the frame assembly. The wire 335 passes loosely through the bell crank lever ear 338 and continues rearwardly to a point of operating connection with line spacing engagement mechanism, later described. The bell crank 339 has a rearwardly directed arm formed with an inwardly directed lateral terminal portion 341 that is provided with an integral upstanding lug 342 which rises at the inner side of the rocker arm 290, as shown in Fig. 31. The lateral portion 341 of the bell crank passes beneath the bottom edge of the rocker arm 290, and when the bell crank 339 is rocked on its pivot by forward pull on the wire 335 the resultant action moves the lug 342 laterally to the left, as viewed in Fig. 6. In this movement the lug pushes the shank of the rocker arm 290 laterally outwardly so that its cam portion 327 is removed from the path of travel of the operating frame-carried abutment 328. In effecting this movement the rocker arm 290 shifts laterally against the tension of the spring 330, as previously described. So long as the function control lever is in its uppermost position this partial disabling of the tabulator mechanism continues. When the function control lever is moved downwardly to its intermediate position the pull on the wire 335 is relieved and the force of the spring 330 again shifts the shank of the rocker arm 290 laterally into its initial position in the path of travel of the operating frame-carried abutment 328.

Even though the tabulator mechanism rocker arm 290 be disabled by the lateral shift under the influence of the function control lever, as described, the tabulator mechanism still is subject to manual operation by depression of the tabulator bar 47. This is possible because of the fact that even though the rocker arm 290 shifts laterally it remains pivoted on its fulcrum stud 291 so that it may operate in its intended manner under the influence of the tabulator bar 47.

The function control lever

When the function control lever 65 is moved to its upper adding position, the pull on the wire 335 is utilized to condition the machine for line spacing operation under cycling movement of the operating frame. In order to accomplish this function the rear end of the pull wire 335 has secured thereto a collar 343 that abuts an ear 344 carried by a bell crank 345 that is pivoted to rock in a vertical plane on a fulcrum stud 346 mounted in a support 347 secured to an element of the main frame. The bell crank 345 has a forwardly extended arm 348 which carries an integral inwardly and laterally directed bridging portion 349 that overlies with appropriate clearance a bracing strut 350 which constitutes an element of the main frame structure. At its inner end relative to the assembly, the bridging portion has a downwardly directed extension 351 that, in turn, has an inward laterally directed terminal lug 352 which provides a lift means that functions in conditioning the machine for line spacing operation under the influence of the operating frame.

When the function control lever 65 is moved to its lowermost position it conditions the machine for straight typing operation. In accomplishing this conditioning the operator crank 331 is rocked on its pivot 332 to elevate a rearwardly and upwardly extending arm 353 that is an integral part of the bell crank operator. This arm 353 is provided at its upper terminal with a laterally directed lug 354 which engages under similarly directed and overlying lug 355 that is integral with the upper end of a substantially cross-shaped rock lever 356. The forward cross arm of the lever 356 is pivoted on the same pivot stud 332 which provides the pivot for the bell crank operator 331. The lower end of the shank of the lever 356 has pivotal connection as at 357 with a forwardly and downwardly extending draw bar 358 which, at its forward end, has a downwardly directed hook 359. The lower edge of the draw bar 358 overlies and rides upon the upper rod 108 of the key converting bail mechanism, previously described. Normally, the hook 359 of the draw bar is disposed forwardly of the rod 108 and the bar is held engaged against the rod by the bias of a spring 360 that is connected between the forward end of the draw bar and a point of anchorage on the lower front of the adjacent bail 109 of the keyboard converting mechanism. When the lifting lever 356 is rocked on its fulcrum point by the lifting action of the ear 354 on the bell crank operator, the lower end of the lever shank moves counterclockwise with respect to Fig. 5 and pulls the draw bar 358 to engage the hook 359 over the rod 108. In this position of the parts the rod 108 of the key converting bail mechanism is held in its rearmost position by engagement of the draw bar hook, and the key converting mechanism is thus disabled. The draw bar is biased in proper operating position through a spring 361 that is connected between the rear end of the draw bar and a point at the end of the rear cross arm of the lever 356. When the function control lever 65 is lifted to one of its upper positions, the lifting ear 354 of the bell crank operator 331 pulls away from its engagement with the overlying ear 355 of the lever 356 and permits the lever 356 to rock downwardly on its fulcrum 332 to its initial position. The function control lever 65 itself is normally fixed in its selected position by the holding action of a spring biased detent plate 362, shown best in Fig. 4, which has a notched edge for cooperative engagement with the shank of the lever to retain the lever in any one of its selected positions.

Line spacing mechanism

Figure 14:
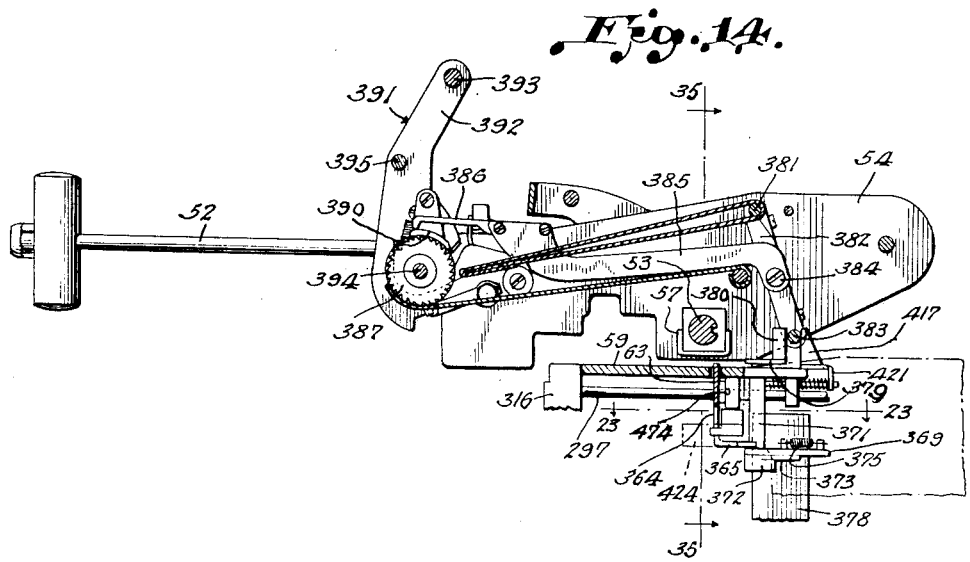
Fig. 14 is a fragmentary section substantially on the line 14—14 of Fig. 1.

With reference to Fig. 11, it will be seen that the control plate 59 mounts the line spacer detent 63 for vertical oscillation through a receiving slot provided in the plate. This detent 63 comprises a transversely extended lever that is fulcrumed at one end to pivot on the shaft 297 with the body of the lever extending transversely in the assembly longitudinally beneath the under surface of the control plate. Spring means 363 is utilized to position the detent lever 63 normally elevated in its receiving control plate slot with its pawl tip 63' in its extreme elevated position. The spring 363 is anchored at one end to a pin extending laterally from one end of the detent lever 63 and is connected at its other end to a point of attachment on a fixed element 363' (see Fig. 35) on the under side of the control plate 59. As shown in Fig. 14, the bottom edge of the detent lever 63 has a vertically depending portion 364 that is formed with a rearwardly and horizontally directed lip 365. The lip 365, as best shown in Fig. 23, has a stepped rear edge providing a shoulder 366 and a curved portion 367 extending from the shoulder to the adjacent edge of the lip. Normally, with the detent lever 63 positioned with its pawl tip in elevated position, the lip 365 is so disposed that its shoulder 366 is spaced forwardly of and in the path of movement of an upstanding stud 368 carried by a horizontal rocker 369 loosely pivoted at one end on a vertical shaft 370 which is disposed within a vertical tubular housing 371 secured at its upper end to the control plate 59. The shaft 370 extends at both ends beyond the adjacent ends of its fixed tubular mounting housing 371. The lower end of this shaft has fixed thereto for rotation therewith a collar 372 formed with an integral horizontal radial arm 373 that lies immediately beneath the rocker 369, extending in the same direction as the rocker. The forward side edge portion of the arm 373 extends forwardly with respect to the adjacent forward side edge of the rocker 369 which immediately overlies it. In the clearance thus provided the arm 373 carries an attached upstanding stud 374 which forms a point of anchorage at one end of a retracting spring 375 that is connected at its other end to a point of attachment 376 on the upper face of the rocker 369. The bias of spring 375 acts to urge the rocker and the underlying arm together in vertical registry to the limit permitted by engagement of the stud 374 against the adjacent forward side edge of the rocker. The rocker 369 has a straight edge portion 377 that is normally biased into contact with an upright 378 fixed to the left side plate L of the operating frame. The upper end of the shaft 370 extends above the plane of the top face of the control plate 59, as shown in Figs. 14 and 19, and has fixed thereon for rotation therewith a radially extending arm 379 which carries an upstanding stud 380.

As shown in Fig. 19, the end plates 54 of the carriage journal transversely between them adjacent their upper rear ends a transversely extending rod 381 which, at each end inside the adjacent plate 54, has fixed thereto for rotation therewith a swinging frame. This frame includes the rod 381 and depending side links 382 that are rigidly connected at their lower ends by a transversely disposed bottom rod 383 which bears against the upstanding stud 380 of the arm 379. The frame link 382 at the left end of the carriage has pivotal connection 384 intermediate its ends with the rear end of a throw link 385 which extends forwardly in parallel relation to the carriage end plate and carries at its forward upturned end a pawl 386. This pawl is adapted to engage the teeth of a ratchet wheel 387 which forms a part of the conventional line spacer mechanism common to typing machines. The ratchet wheel is secured to the adjacent end of the carriage platen. A retracting spring 388, connected between a point of attachment on the shank of the throw link 385 and a point of anchorage 389 on the adjacent end plate 54 of the carriage, normally biases the throw link forwardly to exert a pull on its connection 384 with the frame side link 382. This forward pull urges the bottom rod 383 of the frame forcibly against the upstanding stud 380 and rocks the shaft 370 in a direction counterclockwise, with respect to Fig. 23, so that the arm 373 which underlies the rocker 369 is normally held against, or in the path of movement of, the upright 378 on the operating frame. By bias of the spring 375 the loosely mounted rocker 369 also is urged against the operating frame-carried upright 378 or into the path of movement of the upright when the operating frame moves rearwardly.

With reference to Figs. 19 and 23, when the operating frame moves forwardly in the first half of its cycle the upright 378 moves sufficiently far forward to clear the adjacent end of the rocker 369 and permit a counterclockwise movement of the rocker, relative to Fig. 23, to the point at which it is arrested by engagement of its stud 368 against the shoulder 366 of the line spacer detent lever portion 365. Unless the pawl of the detent lever 63 has been depressed, the lip 365 holds the rocker 369 against further rocking movement. Should the line spacer detent pawl be depressed through engagement by an appropriate one of the lugs 57 on the phase changing member P, the downward movement of the lever at its pawl end acts to shift the lip 365 laterally sufficiently far to move the shoulder 366 from the path of travel of the rocker-carried stud 368. This stud then is free to move without hindrance from the lever-carried lip. With the freedom of movement thus provided the rocker 369 swings counterclockwise behind the forwardly moving operating frame-carried upright 378. In this movement it carries with it the underlying arm 373 that is attached to the shaft 370, so that the shaft is rocked by the pressure of the bottom rod 383 of the swinging frame against the stud 380 under the pull of spring 388. The movement thus provided carries the throw link 385 forwardly to a point at which the tip of its pawl 386 is positioned to engage a tooth of the ratchet wheel 387.

When the operating frame moves rearwardly in the second half of its cycle its upright 378 cams against the rocker 369 and rocks the same clockwise, with respect to Fig. 23, moving it back to its initial position. The bias of spring 375 holds the shaft arm 373 tightly associated with the rocker so that it moves with the rocker to rock the shaft 370 and, through the arm 379 and stud 380 at its upper end, to move the bottom rod 383 rearwardly against tension of the spring 388. This movement carries the rod 383 to its normal position, as shown in Fig. 14. In the course of this movement the throw link 385 is pulled rearwardly to act through its pawl 386 and its engagement with the line spacer ratchet wheel 387 to actuate the mechanism for one line space, until the tip of the pawl 386 is lifted out of engagement with the ratchet wheel teeth as it rides up on the riser portion 390 of a fixed cam secured to an element of the carriage. The mechanism will thus have been manipulated to effect one line spacing operation.

*The front feed bail lock*

A part of the mechanical movement resulting from the operation just described is utilized to effect locking of the front feed bail against opening. This bail, indicated generally at 391, is constructed in accordance with the disclosure in the co-pending application of Clifton King Rainey, Serial No. 580,117, filed February 28, 1945, now Patent No. 2,598,939. Briefly described, it consists of vertical end pieces 392 connected at their upper ends by a transverse handle rod 393 and pivoted at their lower ends on the platen shaft 394. The bail carries a transverse bracing shaft 395 disposed transversely between its end-pieces above the platen and which provides a bearing for the plurality of feed rolls 396, best shown in Fig. 1. After the bail has been opened to admit insertion of the paper and has been returned to paper-holding position, it is highly desirable that it be held against any possibility of being moved to open position during a cycle of the operating frame.

At the right hand end of the carriage, see Figs. 20–22, the frame link 382 has pivotally mounted on its bottom rod 383 a right angled actuator 397. This actuator has a forwardly and downwardly inclined link arm 398 and a substantially vertically disposed short arm 399. The short arm is pivoted at its free end on the bottom rod 383 of the swinging frame comprised of the side links 382 and the rods 381 and 383. Retracting spring means 400, connected between an intermediate portion of the long arm 398 of the actuator and a point of anchorage on the adjacent link 382 intermediate the ends of the link, provides a bias normally urging the actuator 397 in a direction to rock on its pivot whereby to elevate its forward arm 398. Upward movement of the arm 398 is limited by a fixed stop 401 that extends laterally from the adjacent carriage end plate 54 and overrides the edge 402 of a longitudinally disposed recess provided in the shank of the actuator and opening to its top edge. Forwardly, beyond the front end of the recess 402, the actuator arm carries a fixed lateral pin 403 that underlies the bottom edge of a substantially V-shaped latch member 404 having divergent upper and lower arms 405 and 406. The latch member is pivotally mounted at its apex on the adjacent carriage end plate on a fulcrum stud 407 carried by the end plate. A retracting spring 408 connected between a stud 409 on the latch and a point of attachment on the adjacent carriage end plate normally biases the latch to swing vertically downward so that its bottom edge, which is the bottom of the lower short arm 406, normally bears upon the underlying pin 403 of the actuator 397. In the normal position of the parts, as shown in Fig. 21, the latch 405 is held upwardly by engagement of the actuator pin 403 against the bottom edge of the short arm of the latch at a point spaced inwardly of its front end. In this position of the parts the operating frame is in its normal position of rest. With the latch thus held in raised position the front feed bail 392 may be rocked on its platen shaft fulcrum to open or closed position with perfect freedom of movement.

At the start of a cycle of the operating frame, the limited movement permitted by the following action of the rocker 369, see Fig. 23, moving behind the forwardly advancing upright 378 of the operating frame, carries the rocker stud 368 into engagement with the shoulder 366 of the line spacer detent lever lip 365. If this lip is not moved out of the path of travel of the stud 368, as it may be through operation of the mechanism previously described, the stud is arrested at its point of engagement with the lip shoulder and the swinging frame, having the side links 382, will only be moved forwardly to the limited extent permitted by its engagement against the upstanding stud 380 of the rock shaft 370. This limited movement is sufficient to advance the fulcrum point of the lower end of the actuator 397 and correspondingly to carry forward the arm 398 of the actuator until its pin 403 clears the shoulder 410 formed at the inner end of the reduced tip 411 of the latch arm 406. When this occurs the latch rocks downwardly on its fulcrum 407 and its free arm 405 then moves into holding engagement with an element of the front feed bail. This element comprises a laterally directed stud 412 mounted on a bail end piece. When the latch drops down the stud 412 is received in a keeper slot 413 opening from the bottom edge of the upper arm of the latch at its forward end, as best shown in Fig. 20. This engagement of keeper slot and bail stud locks the front feed bail against any possibility of rocking on its fulcrum to open after initiation of movement of the operating frame and until the operating frame returns to its normal position at the end of its cycle. As the operating frame reaches the rearward limit of its second half cycle its upstanding stud 378 cams the rocker 369 rearwardly, which operates, through the movements previously described, to rock the shaft 370 so that its stud 380 bears against the bottom rod 383 of the swinging frame and carries rearwardly the actuator 397; whereby the pin 403 on its forward arm cams against the inclined shoulder 410 of the latch and rides beneath the bottom edge of the latch to rock it on its fulcrum so that its upper arm lifts sufficiently to clear the keeper slot 413 from its engagement with the bail stud 412, whereupon the bail is again in condition for opening and closing.

Means is provided for automatically closing the front feed bail in the event that it be open or not fully closed when the motor bar is tripped to start a cycle of the operating frame. The right hand end piece 392 of the front feed bail is formed at its lower end with a nose 414 which carries a lateral stud 415 that is adapted to be engaged with a laterally directed ear 416 which projects from the front end of the forward arm 398 of the actuator 397. When the front feed bail is in fully opened position, as shown in Fig. 22, its nose stud 415 abuts the ear 416 on the actuator and carries the actuator rearwardly to move the bottom rod 383 of the swinging frame rearwardly. This bottom bar is constantly engaged along its rear side against an upstanding finger piece 417 that is integral with a horizontal plate 418 which, as shown in Fig. 24, is formed as a lever pivoted at one end on a fulcrum mount 419 to oscillate in a horizontal plane on the upper face of the control plate 59. The fulcrum 419 is carried by the control plate and functions also as a fulcrum for a vertically disposed lever plate 420 which oscillates beneath the control plate in a horizontal plane. The upper lever plate 418 has a vertically depending flange 421 on its rear edge which mounts an adjustable stop member 422 provided with a forwardly extending shank that serves at its forward end as a stop engageable by the plate lever 420 to limit or define the spacing between the lever 420 and the flange 421 of the upper plate lever. A retracting spring 423 connected between the flange 421 and the body of the plate lever 420 normally biases the two plate levers into converging relation that is limited only by the adjustment of the stop member 422. As shown in Fig. 23, the lower free end portion of the vertical plate lever 420 is formed with a forwardly directed cam tip 424 obtusely angled relative to the body of the lever 420 to angle inwardly slightly across and above the left hand side plate L of the operating frame. When the front feed bail is moved to open position, the resulting rearward movement of the rod 383 of the swinging frame, as previously described, carries the upstanding finger 417 rearwardly to the positions shown in Figs. 22 and 24. The finger 417 carries the horizontal plate lever 418 rearwardly to rock on its fulcrum 419, and through the pull of the spring 423 it correspondingly pulls rearwardly on the plate lever 420 whereby to dispose its cam tip 424 in the position shown in Fig. 23, with the body of the lever contacting the front vertical edge of the operating frame-carried upright 378.

When the operating frame moves forward at the start of its cycle its upright 378 cams the lever tip 424 forwardly and laterally outward, thereby to rock the lever 420 on its fulcrum and correspondingly pull forward the depending flange 421 of the upper plate lever 418. This movement correspondingly advances the finger 417 forwardly and moves the swinging frame rod 383 forwardly so that the actuator 397 is carried forward. In this forward movement of the actuator its ear 416 abutting the nose stud 415 of the front feed bail rocks the bail on its platen shaft fulcrum so that it is forced into closed position. Thus, it will be evident that even though the bail be fully open or incompletely closed when the operating frame starts forward, the mechanism just described automatically insures that the front feed bail be moved to closing position sufficiently far that the continuance of closing action is taken over by the conventional counterbalance and spring assembly or paper-holding bail mechanism, not here shown.

When the front feed bail is closed the finger 417 of the plate lever 418 is at its forward position as shown in Fig. 21. In this position the plate lever 420 is also disposed so that its cam tip 424 is at one side of the path of movement of the operating frame-carried upright 378.

*Item destroying mechanism*

Figure 7:
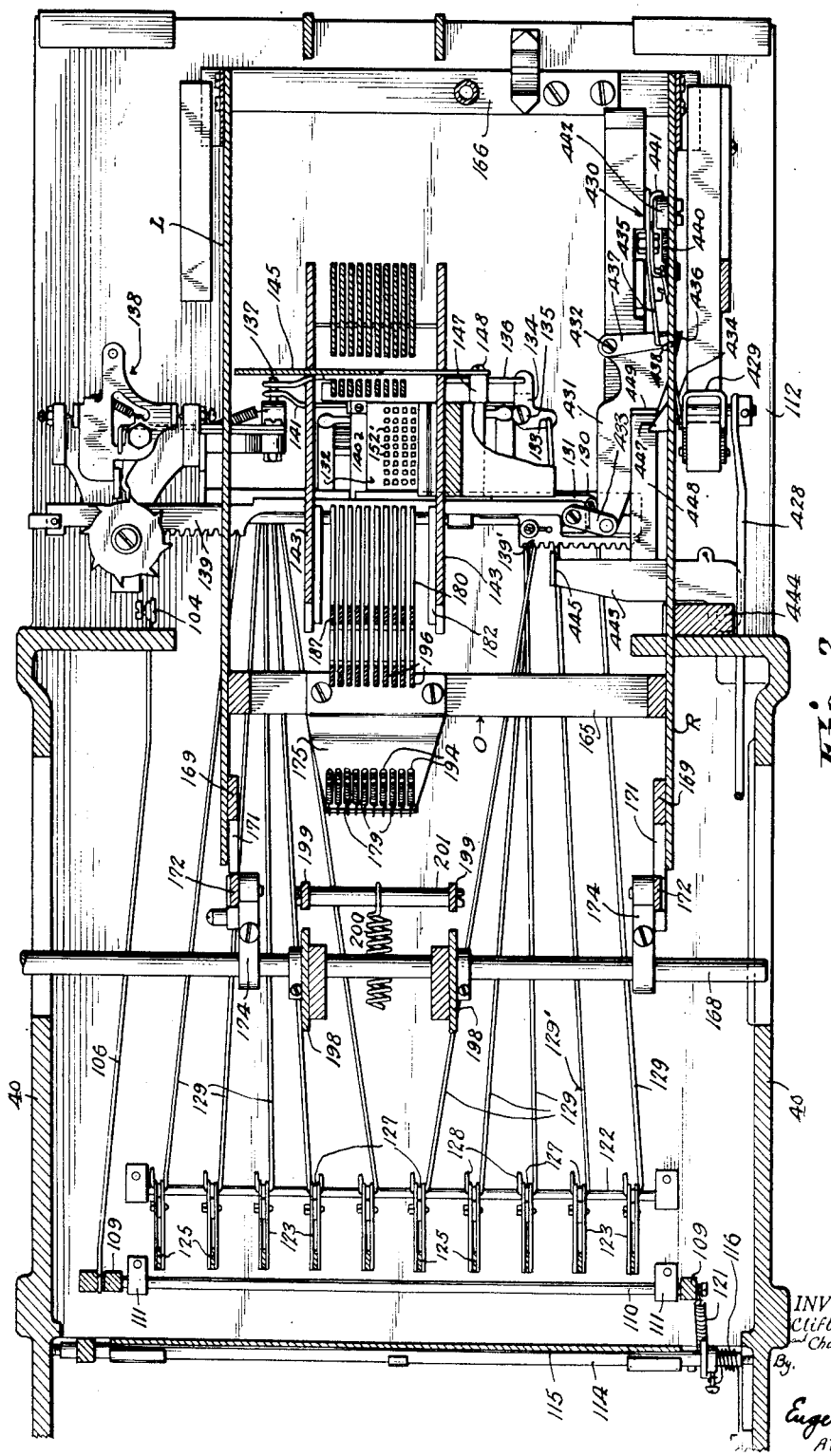
Fig. 7 is a horizontal section substantially on the line 7—7 of Fig. 2.

The machine has mounted at the right hand side of the frame the usual hand-operated correction lever 425 that is arranged to be pulled forwardly and released for spring return to its normal position in carrying out a correction operation. The correction lever functions in the usual manner to rock its actuator shaft 426, shown in Fig. 2, so that when the correction lever is pulled forwardly a crank 427 on the control lever shaft exerts forward pull on a draw wire 428 that extends rearwardly in the frame assembly in pivotal connection at its rear end with the upper end of a vertically disposed lever 429 that is fulcrumed at its lower end on the fulcrum pin 430 carried by a mounting element of the main frame. The lever 429 is adapted to oscillate in a vertical plane. When the lever 429 is rocked forwardly under the influence of the draw wire 428 it actuates spring biased mechanism, generally indicated at 430, which, when the control lever handle is released for return to its initial position, operates to rock a triangular-shaped lever 431 in a manner appropriate to effect shifting of the stop pin box rack 139 for destruction of an item. This triangular shaped lever 431, best shown in Fig. 7, is fulcrumed as at 432 on an element of the main frame so that the lever oscillates in a horizontal plane to shift its forward end laterally in an arc of movement. The forward end of the lever 431 has operative link connection 433 with the stop pin box rack 139.

When the operating frame is in its normal retracted position occupied prior to and following its cycle movement, the stop pin box rack is free to operate under the influence of the correcting lever mechanism for item destroying and also is free to operate in its function of item setting up prior to printing.

The spring bias means generally indicated at 430 functions in association with the correction lever 425 to actuate the stop pin rack for item destroying motion and to release the rack at the conclusion of an item destroying action. In effecting this movement an oscillatory motion of the lever 429 is transmitted through a rearwardly extending connection 434 to a shiftable member 435 that extends substantially parallel to the adjacent right hand side plate R of the operating frame inwardly and below the frame. At its forward end the member 435 has a laterally and upwardly directed hook terminal 436 that normally rests upon a rearwardly and downwardly directed lip 437 on the rear edge of the triangular shaped lever 431. As the correction lever handle is pulled forwardly the vertical lever 429 rocks forwardly to advance the member 435 forwardly riding up on the inclined lip 437 over the top of an integral stud 438 mounted on the triangular lever 431. In this movement of the parts mechanism, generally indicated at 439, functions to shift the member 435 and its hooked terminal vertically downward so that it is engaged with the lever stud 438; and upon the return movement of the correction lever handle to its initial position the resulting rearward movement of the lever 429 through its operating connection with the member 435 moves this member rearwardly to pull the stud 438 rearwardly and thus rock the triangular lever 431 to effect movement of the stop pin rack to the right. Spring means, indicated generally at 440, is in operative connection with the member 435 and an element 441 that is positioned by operative engagement with a lateral stud 442 on the operating frame to draw the hook member 435 rearwardly when the correction handle is released. This rearward movement of the hook member 435 under the influence of the spring means 440 returns the lever 431 to initial position and, at the conclusion of its rearward stroke, the means indicated at 439 in Fig. 2 functions to lift the hook 436 from its engagement with the stud 438 of the rack shifting lever 431, so that the rack shift lever is disengaged at the conclusion of an item destroying operation.

Means is provided for locking the stop pin box against shifting movement in any direction at all times save when the operating frame is at its rearmost limit and is positioned prior to or at the conclusion of an operating cycle. This means includes a latch lever 443 that is fulcrumed as at 444 on an element of the main frame to oscillate in a horizontal plane beneath the right hand side plate of the operating frame. The lever extends laterally and inwardly with respect to the adjacent side of the main frame and at its inner end is provided with an upwardly and laterally directed lug 445 that is adapted to engage the teeth of a plate 139' fixed on the stop pin rack 139 upon appropriate directional movement of the lever. Spring means 446 connected between an ear on the lever and a point of anchorage on the main frame biases the lever to swing clockwise with respect to Figs. 6 and 7 into latching engagement with the teeth of the stop pin rack plate. Locating means 447 fixed on the side of the operating frame normally disposes the latch lever in disengaged position with respect to the stop pin rack when the operating frame is at a position of rest at its rearmost limit of travel. The latch lever has an integral upwardly and rearwardly directed lateral arm 448 that extends rearwardly into the zone of the locating means and which is formed at its rear end with an upstanding lip 449 that is engaged against a forwardly and inwardly inclined vertical face of the locating means 447. The locating means 447 is, in effect, a wedge effective to cam the lip 449 laterally by its entrant action so that the latch lever is rocked into a position of disengagement and is maintained in this position of disengagement so long as the locating means is operatively engaged with the latch lever-carried lip 449. When the operating frame moves forward the wedge 447 is carried forwardly so that it clears the lever lip 449. The bias of the spring 446 carries the lever clockwise, with respect to Figs. 6 and 7, as soon as the operating frame is moved sufficiently forward to clear engagement between its wedge 447 and the lever lip 449. In consequence the latch lever is carried into latching engagement with the stop pin rack teeth and the stop pin box is held against shifting in any direction. When the frame returns to its rearmost position in the second half of its cycle the wedge 447 cams the latch lever lip 449 laterally and rocks the latch lever 443 to its disengaged position in which it remains until another cycle of the operating frame is initiated.

It will be noted that the arresting engagement of the latch lever 443 with respect to the stop pin box occurs as soon as the operating frame begins to move forward in the first half of its cycle, and that the latch lever is continued in its arresting engagement with the stop pin rack until the operating frame arrives at a point almost at the extreme limit of its rearward travel. There is thus provided a range of mechanical movement which is utilized to build up tension on the spring means 440. Otherwise stated, the item destroying movement of the stop pin box cannot occur until latch lever 443 is disengaged from the stop pin rack and this disengagement cannot occur until the operating frame has arrived at the point, almost at the extreme rear limit of its movement, at which the frame-carried wedge 447 cams the lip 449 to disengage the latch lever. While the frame is moving rearwardly prior to disengagement of the latch lever tension on the spring means 440 is building, and when the lever is disengaged the spring functions in the manner previously described to rock the shift lever 431 on its pivot and draw the stop pin box and rack to the right in an item destroying action.

*The restore bar*

With reference particularly to Figs. 6, 11, 12 and 13, it wil be seen that the restore bar 160 is mounted for reciprocation forwardly and rearwardly in the assembly and is carried by the operating frame. The bar 160 extends transversely between the side plates of the operating frame and is supported slidably on the upper edges thereof by attached saddle blocks 450 which straddle the upper edges of the sides of the operating frame. The restore bar is rectangular in cross section and is attached in brackets 451 provided with rearwardly directed portions which form connecting points for a bank of springs 452 that extend rearwardly from the brackets 451 to anchor brackets 453 attached to uprights 454 secured to the operating frame at its rear end. The restore bar and operating frame are relatively movable. Normally, the restore bar is retained at its rear limit of travel by adjustable stops 455 that are mounted in the downturned rear ends of brackets 456 which extend forwardly in the assembly and which are anchored at their forward ends to an element of the main frame. Adjustment of the stops 455 determines the rearmost limit of movement of the restore bar. The side edge plates of the operating frame are formed at their upper edges each with a shoulder 457 that is spaced rearwardly with respect to the restore bar when the operating frame is at its rear limit of travel, as best shown in Fig. 13. When the operating frame is in a position of rest at its rearmost limit of travel the banks of springs 452 are under tension normally urging the restore bar and rear end of the frame into relative converging movement that is prevented by engagement of the restore bar against the stops 455. When the operating frame starts forward in the first half of its cycle the tension of springs 452 acts to pull the frame forwardly with an initial force that is already in effect before the frame begins to move under the influence of the motor drive shaft 168. This bias materially assists the motor in picking up its operating speed at the start of the operating frame cycle.

The bias of the springs 452 is effective until the operating frame advances forwardly to the point at which its shoulders 457 engage the rear of the restore bar, after which the bar is carried forwardly with the operating frame under positive movement thereby. During the interval required for the operating frame shoulders 457 to engage and begin to move the restore bar, the advance of the frame places the springs 179 and 194 under tension. These are the springs, shown in Figs. 12 and 13, which function to move the calculating unit actuator slides 142 and the adding type bar actuators 153 forwardly in their actuation. Tension on the springs 194 operates through the slide extensions to pull the slides 142 forwardly until their leading edge portions contact the rear edge of the restore bar. At this point further forward movement of the slides 142 is at the rate of movement of the operating frame for those slides which are permitted to move forward.

After the completion of indexing and when the operating frame begins to move rearwardly through the second half of its cycle the springs 452 again are brought under tension to pull the restore bar rearwardly following the movement of the operating frame. This movement continues until the restore bar arrives at its rear limit as determined by the setting of the stop members 455. As the restore bar moves rearwardly it carries with it the slides 142 of the calculating mechanism and also it functions through the pull rods 159 to pull down the yoke 157 and its supporting side plates so that the adding type bar lift actuators 153 are returned to their depressed initial position. As previously described in connection with the operation of the calculator slides in the indexing function, the position of rest reached by the actuators 153 when depressed under rearward pull of the yoke 157 is such that the short arms 155 of the actuator bar cranks are disposed rearwardly in spaced relation with respect to the inserts 191 of the extensions of the slides 142, whereby the adding type bars are held in fully retracted position.

The restore bar 160 has pivotal connection 458 at its left end with its associated saddle block 450 and at its other end is longitudinally slotted to receive slidably the shank of an upstanding securing element 459 carried by the subjacent saddle block 450. By this arrangement the restore bar is permitted a limited rocking movement on its pivot to the extent determined by limits of the slot in its opposite end. The advantage of this arrangement is that, should an obstruction occur during the restoring operation while the calculator slides are moving rearwardly, the restoring bar bearing on the leading edge of a stuck slide would apply no force beyond that of the limit of the springs 452. The stuck slide would become, in effect, a fulcrum point on which the restore bar would rock to permit self-alignment of the sliding saddle block 450.

*The subtract actuator*

With reference to Figs. 11 and 35 in connection with Fig. 5, it will be seen that the subtract detent 62 projects upwardly through its receiving slot in the control plate 59 in position for engagement by one of the control lugs 57 of the series carried by the phase changing mounting member 56. This detent 62 is integral with a depressible lever 460 that extends longitudinally of the control plate 59 directly beneath the plate and which is pivoted at its left end to rock on the shaft 297. The opposite end of the lever is biased upwardly into contact with the under face of the control plate by means of a leaf spring 461 which engages the under edge of the lever and normally retains it in contact against the control plate. Also fulcrumed on the shaft 297 and directly alongside the lever 460 there is provided a pull down lever 462 which is pivoted on the shaft 297 intermediate its ends. The right hand end of the pull down lever extends in parallel relationship to the detent lever 460 and at its end portion is provided with a hook 463 which is engaged over a lateral stud 464 which projects from the adjacent face of the detent lever 460. At its left hand end the hold down lever 462 rests upon the upper face of a lift lug 465 which extends laterally from the rearwardly extending arm 466 of a bell crank 467 that is pivotally suspended from a fulcrum 468 mounted on an element of the main frame. The subtract key 51 is mounted at the outer end of a rearwardly extending rod 469 which, adjacent the bell crank 467, has a downwardly directed portion 470 that is looped at its lower end for pivotal engagement over a stud 471 carried by another arm 472 of the bell crank. When the key 51 is pushed inwardly the rearward travel of the depending portion 470 of the rod 469 operates to rock the bell crank 467 to lift its bearing tip 465 and correspondingly to elevate the left hand end of the hold down lever 462 which normally is seated on the lug 465. This elevating action rocks the lever 462 on its fulcrum so that its hooked end 463 is depressed and draws down the detent lever 460 by its engagement with the pin 464. As the lever 460 is depressed against the bias of the spring 461 the subtract detent 62 is moved downwardly in its receiving slot in the control plate. In its downward movement under the influence of the manipulation of the subtract key the lever 460 operatively engages and actuates an element 473 of the calculating unit so that it is conditioned for subtract operation.

The line space detent lever 63, indicated in dotted line in Fig. 35, extends longitudinally beneath the control plate 59 and, as previously described, is fulcrumed on shaft 297 to rock in accordance with the depression and elevation of its detent pawl which extends upwardly through the control plate slot. This lever normally is biased under the action of its spring 363 to elevate its right hand end into contact with the under face of the control plate so that its detent is elevated with respect to the control plate-receiving slot. As in the case of the subtract lever 460, the line space detent lever 63 is similarly flanked by a hold down lever 474 that is identical in construction to the hold down lever 462 described in connection with the subtract mechanism. This hold down lever 474 is fulcrumed on the shaft 297 and at its left end extends downwardly into a bearing portion 475 that normally is spaced slightly above the lifting tip 352 of the crank 348 that is actuated by lifting movement of the function control lever 65 through the pull exerted by the wire 335, as described. When the bell crank 348 is rocked to elevate its bearing tip 352 the tip moves up and engages the bearing portion 475 of the lever 474 and elevates the end of the hold down lever to depress its forward end which, as previously stated, has a pull down connection with its associated line spacer detent lever 63 similar to that of the subtract lever 460. The resultant action depresses the right hand end of the lever 63 and as a result of its downward movement it conditions the line space mechanism for operation in the manner previously described.

General operation

When the machine is to be used for straight typing purposes the selective function control lever 65 is placed in its lowermost position. This locks the key converting means against operation and permits full strike operation of all the letter type and numeral type bars in the usual manner of typing machines. In such use carriage tabulation and line spacing normally is effected manually. However, if an operator so desires, the tabulation and line spacing may be accomplished automatically through cycling of the operating frame O, simply by tripping the motor bar 46, provided the phase changing means P and its control lugs 57 are properly set. Until the function control lever is shifted to an upper position, no element of the calculating mechanism or adding type carrier operating means can move sufficiently far to become effective when the operating frame cycles.

When the machine is to be used as a calculating machine, the function control lever is set at its uppermost position. This frees the key converting means so that, when the carriage is located at the appropriate position, one of the phase change control lugs 57 depresses the lug 60 (see Fig. 15) whereby the letter and numeral type bars are prevented from moving to full strike position. The numeral keys are permitted a limited movement sufficient to enable them to function in indexing the adding type carriers. Operation of the numeral keys then indexes the adding type carriers through the stop pin box mechanism. The motor bar is then tripped to cycle the operating frame.

As the operating frame starts forward in the first half of its cycle the stop pin box is locked against any shifting movement until the operating frame returns almost to its initial position of rest; so that item destroying action of the correction means cannot take place until the operating frame is nearing the end of its second half cycle or is in a position of rest. At the same time, the calculating mechanism actuators move to their positions as determined by the indexing means or any other instrumentalities by which they may be governed. Each actuator is paired with a corresponding adding type carrier. Those actuators which move beyond their zero positions disengage the latches which hold their corresponding paired type carrier moving means, whereupon the freed adding type carriers are moved up into printing position, leaning at various angles of inclination against the aligning comb in front of the platen. As the operating frame approaches its forward limit of travel in the first half cycle it brings into action the means for rocking the comb to bring the adding type carriers into coplanar alignment.

At this point the hammer is triggered to strike uniformly against the aligned type carriers to print therefrom, and the operating frame starts back in its second half cycle. During return of the operating frame the ribbon is lowered and shifted and the line spacer mechanism is operated. The calculating actuators are restored to their original positions and when moving back they act on the adding type carrier moving means to pull their paired type carriers down out of printing position. At the same time, the yoke 157, through its connection with the restore bar 160, modulates the movement of the bell crank levers 153 to dispose their latching heads 189 rearwardly when the calculating actuators have come to rest, so that the latches are reengaged and the bell crank levers are held away from their associated calculating actuator slides. The machine is then ready for indexing and printing another line of adding type items.

When the machine is to be employed for posting, the function control lever is set in its intermediate position. In this position of the lever some adding and typing machine functions are disabled and others are retained, depending on the setting of the phase changer P and its control lugs. At each columnar position determined by the tabulator mechanism, the cooperative relationship of the phase change control lugs with the various pawls and detents operable through the slots in the control plate 59 determines the nature of the machine functions at that point; for example, at one columnar position the machine may list and tabulate, at another it may index and print adding type items and tabulate, or index and print adding type items with line spacing, at another it may print and subtract adding type items and then tabulate, and so on through all the various aspects of posting.

It is to be understood that the present disclosure is illustrative and not restrictive, and that the invention may be practiced in any form consistent with its scope as claimed.

We claim:

1. An accounting machine comprising a main frame, a platen carriage thereon, a single keyboard with both letter keys and numeral keys, letter type bars and numeral type bars movable to full platen striking position by operation of said keys, adding mechanism including adding type bars, means shiftable into and out of the path of the type bars by the carriage element and selectively notched to prevent operation of the letter type bars while permitting movement of the numeral type bars part way to their full striking position, and adding type bar indexing means operative from the numeral keys when controlled by said full strike preventing means.

2. An accounting machine comprising a main frame, a platen carriage thereon, a single keyboard with both letter keys and numeral keys, letter type bars and numeral type bars movable to full platen striking position by operation of said keys, adding mechanism including adding type bars, preventing means engageable with the numeral key bars to limit their movement to less than full strike, adding type bar indexing means operative from the numeral keys when controlled by the preventing means, and said preventing means blocking actuation of the letter type bars while permitting said limited movement of the numeral key bars said preventing means comprising a plate shiftable into and out of the path of movement of the type bars and having notches underlying the numeral type bars when in blocking position to permit limited movement thereof.

3. An accounting machine comprising a main frame, a platen carriage thereon, a single keyboard with both letter keys and numeral keys, letter type bars and numeral type bars movable to full platen striking position by operation of said keys, calculating mechanism including adding type elements movable to and from printing position at and immediately adjacent the striking point of the type bars, carriage tabulator means, preventing means operative from said tabulator for shifting movement into and out of the path of the type bars and contoured to block movement of the letter type bars while permitting partial movement of the numeral type bars to full striking position, and adding type element indexing means operative by the numeral key bars when under control by the preventing means.

4. An accounting machine comprising, in combination, a typing machine and a calculating machine having a single keyboard and a type printing point common to both, a movable carriage thereon, a ribbon adjacent the printing point, a ribbon wind mechanism normally operated by carriage movement and a ribbon lift mechanism for the typing machine normally operated by key movement, said calculating machine including adding type elements movable into and out of printing position, selective control means manually adjustable to prevent operation of the typing machine including carriage movement during operation of the calculating machine and vice versa, operating means for the calculating machine, and means actuated by the calculating machine operating means for actuating the ribbon wind and ribbon lift mechanism independently of the typing machine key operation and the carriage movement.

5. In an accounting machine, the combination of a typing machine and a calculating machine, separate groups of type printing elements for each machine, a single keyboard common to both groups of type printing elements for controlling operation of same, a carriage on said machine to receive printing in the same area from both groups of type printing elements and shiftable laterally to predetermined positions of adjustment, an extension on said carriage, means operable by said extension upon shifting movement of said carriage to predetermined positions of adjustment to convert the keyboard from operation with one group of type elements to operation means for positioning the other group of type elements, manually operated control means shiftable to a plurality of positions of adjustment one of which renders the means operated by said extension ineffective for conversion of the operation of the keyboard from one group of type printing elements to the other upon engagement by said extension during shifting movement of the carriage to predetermined positions of adjustment.

6. In an accounting machine having a main frame, a platen carriage shiftable to predetermined positions of adjustment on said main frame, a group of typewriter type elements, a group of calculating type elements, a group of stops for controlling the calculating type elements, a keyboard normally connected for operation of said typewriter type elements, one means operative upon shifting movement of the carriage for conversion of the keyboard from operation with the typewriter type elements to operation with stops for the calculating type elements under control of the stops, a machine cycling member, a tabulating means operably connected normally to said cycling member for shifting the carriage to predetermined positions of adjustment during a cycle of operation, and a manually operable selector which when shifted to one position permits the tabulating means normally to actuate the carriage and said one means to be operated by said carriage, and which when shifted to a second position permits the one means to block conversion of said keyboard for connection with said calculating type elements, and which when shifted to a third position disconnects said tabulating means from said cycling member.

7. In an accounting machine having a main frame, a platen carriage shiftable to predetermined positions of adjustment on said main frame, a group of typewriter type elements, a group of calculating type elements, and a group of stops controlling the calculating type elements, a keyboard normally connected for operation with said typewriter type elements and connectable with said calculating type stop elements, one means operative upon shifting movement of the carriage for conversion of the keyboard to prevent operation of said typewriter type elements to operative connection with said calculating type stop elements, a machine cycling member, a platen line space mechanism operable by said cycling member to effect line spacing when connected therewith, a second means responsive to the carriage for connecting said line space mechanism with said cycling member for actuation thereby during its cycle of operation, a tabulating means operably connected normally to said cycling member for shifting the carriage to predetermined positions of adjustment during a cycle of operations, and a manually operable selector which when shifted to one position permits the tabulating means normally to actuate the carriage and said one means to be operated by said carriage, and said second means to be operated by said cycling member and which when shifted to a second position permits the one means to block conversion of said keyboard for connection with said calculating type element stops and which when shifted to a third position connects the second means with the cycling operating member for actuation thereby and disconnects said tabulating means from said cycling member.

8. An accounting machine comprising in combination, a typing machine and a calculating machine having a single keyboard and a type printing point common to both, a ribbon adjacent the printing point, a ribbon wind mechanism forming a part of the typing machine, adding type elements forming a part of the calculating machine, means for preventing operation of one of the machines while the other is in operation, an operating member for the calculating machine, a pawl mounted for rocking movement into and out of engagement with the ribbon wind mechanism for effecting operation thereof, spring means constantly urging the pawl into the direction for operatively engaging the ribbon wind mechanism, an abutment holding the pawl out of engagement with the ribbon wind mechanism, and an operative connection between said abutment and the operating member for withdrawing the abutment during operation thereof to permit actuation of the ribbon wind mechanism by said pawl.

9. In an accounting machine, the combination of a typing machine and a calculating machine, separate groups of type printing elements for each machine, a single keyboard common to both groups of type elements for operation of same, rocker means shiftable between the keys of the keyboard to an inoperative position displaced from the path of the keys in a manner to prevent operation when the keys are displaced to a fully depressed position and to an operative position in the path of the keys for actuation thereof when the keys are partially depressed, blocking means shiftable between blocking position in the path of the keys to prevent movement beyond partially depressed position and unblocking position out of the path of the keys to permit full depression, means for manually shifting the rocking means to one of its positions of adjustment, and means for shifting said blocking means to blocking and unblocking position upon movement of the rocking means to operative and inoperative positions respectively.

10. In an accounting machine, the combination of a typing machine and a calculating machine, separate groups of type printing elements for each machine, a single keyboard common to both groups of type elements for operation of same, rocker means shiftable between the keys of the keyboard to an inoperative position displaced from the path of the keys in a manner to prevent operation when the keys are displaced to a fully depressed position and to an operative position in the path of the keys for actuation thereof when the keys are partially depressed, blocking means shiftable between blocking position in the path of the keys to prevent movement beyond partially depressed position and unblocking position out of the path of the keys to permit full depression, means for manually shifting the rocking means to one of its positions of adjustment, means for shifting said blocking means to blocking and unblocking position upon movement of the rocking means to operative and inoperative positions respectively, and means responsive to movement of the carriage for adjusting said blocking and rocking means to operative and inoperative and to blocking and unblocking positions respectively.

11. In an accounting machine, the combination of a typing machine and a calculating machine, separate groups of type printing elements for each machine, a single keyboard common to both groups of type elements for operation of same, rocker means shiftable between the keys of the keyboard to an inoperative position displaced from the path of the keys in a manner to prevent operation when the keys are displaced to a fully depressed position and to an operative position in the path of the keys for actuation thereof when the keys are partially depressed, blocking means shiftable between blocking position in the path of the keys to prevent movement beyond partially depressed position and unblocking position out of the path of the keys to permit full depression, means for manually shifting the rocking means to one of its positions of adjustment, means for shifting said blocking means to blocking and unblocking position upon movement of the rocking means to operative and inoperative positions respectively, and an operative connection between the keys and the typewriter printing elements for actuation of same upon movement of the keys to depressed position and an operative connection between said rocking means and the calculator printing positioning elements for actuating same responsive to movement of the keys to partially depressed position when said rocking means is in operative position.

12. In an accounting machine, the combination of a typing machine and a calculating machine, separate groups of type printing elements for each machine, a single keyboard common to both groups of type elements for operation of same, rocker means shiftable between the keys of the keyboard to an inoperative position displaced from the path of the keys in a manner to prevent operation when the keys are displaced to a fully depressed position and to an operative position in the path of the keys for actuation thereof when the keys are partially depressed, blocking means shiftable between blocking position in the path of the keys to prevent movement beyond partially depressed position and unblocking position out of the path of the keys to permit full depression, means for manually shifting the rocking means to one of its positions of adjustment, means for shifting said blocking means to blocking and unblocking position upon movement of the rocking means to operative and inoperative positions respectively, means responsive to movement of the carriage for adjusting said blocking and rocking means to operative and inoperative and to blocking and unblocking positions respectively, and an operative connection between the keys and the typewriter printing elements for actuation of same upon movement of the keys to depressed position and an operative connection between said rocking means and the calculator printing positioning elements for actuating same responsive to movement of the keys to partially depressed position when said rocking means is in operative position.

13. In an accounting machine, the combination of a typing machine and a calculating machine, separate groups of type printing elements for each machine, a single keyboard common to both groups of type printing elements for operation of same and in which the keys are shiftable between a fully depressed position and a partially depressed position, an operative connection between the keys and the type printing elements of the typing machine for actuation of the typewriter printing elements when the keys are actuated to a fully depressed position and means shiftable into the path of the keys for effecting an operative connection between the keys and the type printing elements of the calculating machine concurrently with the operative connection between the keys and the type printing elements of the typing machine for actuation of the type printing elements of the calculating machine when the keys are partially depressed.

14. In an accounting machine, the combination of a typing machine and a calculating machine, separate groups of type printing elements for each machine, a single keyboard common to both groups of type printing elements for operation of same and in which the keys are shiftable between a fully depressed position and a partially depressed position, an operative connection between the keys and the type printing elements for actuation of the typewriter printing elements when the keys are actuated to a fully depressed position, means shiftable into the path of the keys and having an operative connection with the calculator printing elements for actuation of same when the keys are partially depressed, and blocking means shiftable into and out of the path of the keys upon movement of said means operatively connected to the calculator printing elements into the path of the keys to block full depression of the keys when in blocking position and to permit full depression of the keys when in the path of the keys and to permit full depression of the keys when out of the path of the keys References Cited in the file of this patent

UNITED STATES PATENTS

| Number | Name | Date |
|---|---|---|
| 972,150 | Barrett | Oct. 11, 1910 |
| 1,049,093 | Hopkins | Dec. 31, 1912 |
| 1,050,388 | Pike | Jan. 14, 1913 |
| 1,053,943 | Dorman et al. | Feb. 18, 1913 |
| 1,254,583 | De Roode | Jan. 22, 1918 |
| 1,280,065 | Minton | Sept. 24, 1918 |
| 1,317,604 | Theime | Sept. 30, 1919 |
| 1,320,018 | McKay | Oct. 28, 1919 |
| 1,688,805 | Degener | Oct. 23, 1928 |
| 1,817,451 | Gubelmann | Aug. 4, 1931 |
| 1,817,815 | Green | Aug. 4, 1931 |
| 1,861,618 | White | June 7, 1932 |
| 1,876,719 | Mehan | Sept. 13, 1932 |
| 1,924,653 | Gubelmann | Aug. 29, 1933 |
| 1,938,168 | Ball | Dec. 5, 1933 |
| 1,958,925 | Pearson | May 15, 1934 |
| 2,019,900 | Fuller | Nov. 5, 1935 |
| 2,183,920 | Rainey | Dec. 19, 1939 |
| 2,192,324 | Muller | Mar. 5, 1940 |
| 2,255,029 | Tholstrup | Sept. 2, 1941 |
| 2,255,623 | Landsiedel | Sept. 9, 1941 |
| 2,285,311 | Sundstrand | June 2, 1942 |
| 2,303,878 | Helmond | Dec. 1, 1942 |
| 2,348,789 | Crosman | May 16, 1944 |
| 2,366,468 | Anderson | Jan. 2, 1945 |
| 2,394,950 | Sundstrand | Feb. 12, 1946 |
| 2,442,402 | Davidson et al. | June 1, 1948 |
| 2,496,357 | Rainey | Feb. 7, 1950 |